(12) United States Patent
Kihara et al.

(10) Patent No.: US 6,656,362 B1
(45) Date of Patent: Dec. 2, 2003

(54) SPIRAL REVERSE OSMOSIS MEMBRANE ELEMENT, REVERSE OSMOSIS MEMBRANE MODULE USING IT, DEVICE AND METHOD FOR REVERSE OSMOSIS SEPARATION INCORPORATING THE MODULE

(75) Inventors: Masahiro Kihara, Otsu (JP); Shinichi Minegishi, Otsu (JP); Takayuki Nakanishi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/485,934

(22) PCT Filed: Jun. 18, 1999

(86) PCT No.: PCT/JP99/03274

§ 371 (c)(1),
(2), (4) Date: Feb. 18, 2000

(87) PCT Pub. No.: WO99/65594

PCT Pub. Date: Dec. 23, 1999

(30) Foreign Application Priority Data

Jun. 18, 1998 (JP) .............................. 10-171210
Apr. 9, 1999 (JP) .............................. 11-102310

(51) Int. Cl.$^7$ .................. B01D 61/00; B01D 63/00
(52) U.S. Cl. .................. 210/652; 210/641; 210/321.74; 210/321.83; 210/493.4; 210/195.2
(58) Field of Search .................. 210/321.74, 321.83, 210/493.4, 195.2, 416.1, 652, 641, 195.1

(56) References Cited

U.S. PATENT DOCUMENTS

| 4,046,685 A | * | 9/1977 | Bray |
| 4,301,013 A | * | 11/1981 | Setti et al. |
| 4,548,714 A | * | 10/1985 | Kirwan, Jr. et al. |
| 4,906,372 A | * | 3/1990 | Hopkins |
| 4,973,408 A | * | 11/1990 | Keefer |
| 5,073,263 A | | 12/1991 | Fagundes et al. |
| 5,096,591 A | | 3/1992 | Benn |
| 5,128,037 A | * | 7/1992 | Pearl et al. |
| 5,207,916 A | * | 5/1993 | Goheen et al. |
| 6,139,750 A | * | 10/2000 | Graham |
| 6,224,767 B1 | | 5/2001 | Fujiwara et al. |

FOREIGN PATENT DOCUMENTS

| JP | 5-168869 | 7/1993 |
| JP | 9-299770 | 11/1997 |
| JP | 10-5554 | 1/1998 |
| JP | 10-156357 | 6/1998 |
| JP | 10-230145 | 9/1998 |

\* cited by examiner

*Primary Examiner*—Ana Fortuna
(74) *Attorney, Agent, or Firm*—Birch Stewart Kolasch & Birch LLP

(57) ABSTRACT

A spiral reverse osmosis membrane element of the present invention includes a plurality of bag-shaped reverse osmosis membranes, permeated liquid passage members arranged inside the reverse osmosis membranes, and a plurality of feed liquid passage members interposed between the reverse osmosis membranes, those membranes and passage members being wound around an outer surface of a hollow pipe in a manner that only the interiors of the reverse osmosis membranes communicate with through-holes formed in the surface of the hollow pipe. Each of the feed liquid passage members is a mesh member having series of quadrilateral meshes formed by a plurality of linear members crossing each other. Two opposite cross-points out of four cross-points of each of the quadrilateral meshes are in line in parallel with an axial direction of the hollow pipe. And relations 2 mm≦X≦5 mm and X≦Y≦1.8X are both satisfied where X denotes a distance between the cross-points in a direction perpendicular to the axial direction of the hollow pipe and Y denotes a distance between the cross-points in the axial direction of the hollow pipe.

18 Claims, 8 Drawing Sheets

SPIRAL REVERSE OSMOSIS MEMBRANE ELEMENT, REVERSE OSMOSIS MEMBRANE MODULE USING IT, DEVICE AND METHOD FOR REVERSE OSMOSIS SEPARATION INCORPORATING THE MODULE

This application is the national phase under 35 U.S.C. §371 of PCT International Application No. PCT/JP99/03274 which has an International filing date of Jun. 18, 1999, which designated the United States of America.

TECHNICAL FIELD

The present invention relates to a spiral reverse osmosis membrane element capable of producing permeated water with a small quantity of input energy at a low operating cost, a high salt rejection and a high water permeation rate or water flow rate when applied to seawater desalination, and relates to a reverse osmosis membrane module using the aforementioned element, a reverse osmosis separation apparatus incorporating therein the module, and a reverse osmosis separation method.

BACKGROUND ART

A reverse osmosis separation method is a method for obtaining permeated liquid having a low solute concentration by passing a solution through a reverse osmosis membrane at a pressure higher than its osmotic pressure to thereby separate and remove part of a solute. The reverse osmosis separation method is adopted in technical fields such as seawater desalination, brackish water desalination, production of ultrapure water, concentration of waste water, and recovery of valuables from waste water.

Especially in seawater desalination, the reverse osmosis separation method is coming into wide use since it does not entail a phase change, needs less energy and is easier to control as compared with a conventional evaporation method.

To perform the reverse osmosis separation method, a spiral reverse osmosis membrane element, for example, is used whose structure will be described below referring to drawings.

FIG. 1 is a schematic perspective cutaway view of the element, and FIG. 2 is a cross sectional view taken along line II—II of FIG. 1.

The element has a hollow pipe 1 arranged at the center of the element and having a surface thereof formed with a plurality of through-holes 1a. Reverse osmosis membranes 2, permeated liquid passage members 3, and feed liquid passage members 4 are wound around the outer surface of the hollow pipe 1 in a manner described below.

Each reverse osmosis membrane 2 has a bag-like shape as a whole, and a permeated liquid passage member 3 is arranged therein. The bag-shaped reverse osmosis membranes 2 are attached to the outer surface of the hollow pipe 1 with their openings 2a enclosing through-holes 1a formed in the hollow pipe 1 so that the interior of the reverse osmosis membranes 2 and the permeated liquid passage members 3 may communicate with the through-holes 1a.

Each feed liquid passage member 4 is arranged between reverse osmosis membranes 2 associated therewith, and frame members 5 configured to allow liquid to pass therethrough are attached to both ends of the membrane and passage member assembly, whereby the spiral structure is attained.

The above-mentioned element is arranged in a pressure vessel and is adapted to be supplied at its one end (upstream side) with feed liquid 6 at a predetermined pressure.

As the feed liquid 6 flows along the feed liquid passage members 4, it undergoes reverse osmosis separation by the reverse osmosis membranes 2, to be separated into permeated liquid and a solute. The permeated liquid, passing through the reverse osmosis membranes 2 and having a low solute concentration, flows into the through-holes 1a and gathers in the hollow pipe 1. The permeated liquid 6a is then taken out from the downstream side of the element.

The feed liquid which has not passed through the reverse osmosis membranes 2 continues flowing along the feed liquid passage members 4 to the downstream side. In the course of flowing, the feed liquid takes in the solute separated from the feed liquid and left on the membrane surfaces, to become concentrated liquid 6b having a high solute concentration.

There is a critical problem in operating the element such that the element performance lowers due to concentration polarization.

The concentration polarization is a phenomenon that fouling substances, such as impurities and contaminants contained in the feed liquid, are enriched on the membrane surfaces of reverse osmosis membranes 2 which are in contact with feed liquid passage members 4, so that the solute and fouling substance concentration of the feed liquid becomes higher on the membrane surface. As a result, the osmotic pressure becomes higher.

When the concentration polarization occurs, the quantity of permeated liquid decreases, and impurities such as gel and scale precipitate on the membrane surface. For this reason, the reverse osmosis membrane cannot develop its capability and the performance of the element lowers.

The occurrence of the concentration polarization can be suppressed by making the flow of the feed liquid on the membrane surface turbulent. For example, the turbulent flow occurs more easily by using the feed liquid passage member 4 of a smaller thickness to increase the linear velocity of the feed liquid on the membrane surface, so that the concentration polarization layer may be thinned.

With the feed liquid passage member 4 having a smaller thickness, however, the passage defined by the feed liquid passage member 4 is easily clogged with fouling substances contained in the feed liquid such as impurities and microorganisms. As a result, the element performance lowers and the pressure loss in the feed liquid increases. To keep up the quality and quantity of permeated liquid, the operating pressure for the feed liquid needs to be raised, and hence a high-pressure pump requiring electric power to operate and pressure pipes must be provided, resulting in increased liquid production costs.

Conventionally, a net member having a net structure as shown in FIG. 3 is widely used as a feed liquid passage member 4.

The net member has meshes in the form of series of quadrilaterals formed by linear members 7a and 7b crossing each other. The net member is arranged between reverse osmosis membranes 2 and is wound around the hollow pipe in a manner that opposite two cross-points 7c, 7d out of four cross-points 7c, 7d, 7e, 7f of the linear members 7a, 7b are in line in the flow direction of the feed liquid 6, i.e., in parallel with the axial direction of the hollow pipe 1. This kind of net structure is effective in decreasing the concentration polarization, because the feed liquid 6 flowing along the net structure forms a turbulent flow effectively.

In this conventional net member, the quadrilateral mesh is formed into a square shape, that is, the four sides of the quadrilateral mesh have the same length, and the distance (X) between the cross-points 7e, 7f is equal to the distance (Y) between the cross-points 7c, 7d. The absolute value of an angle ($\alpha$) between the line connecting the cross-points 7c, 7d and the linear member (mesh leg) 7a(7b) is 45°.

When the conventional net member having the size and shape described above is used as a feed liquid passage member, the flow of the feed liquid can be made turbulent. However, there is a problem that the pressure loss in the feed liquid increases, so that the operation cost and the equipment cost may increase.

Japanese Provisional Patent Publication No. 5-168869 discloses a special net member which comprises first linear members arranged in parallel with the flow direction of the feed liquid and second linear members crossing the flow direction of the feed liquid at an angle smaller than 45°. When this net member is used as a feed liquid passage member, the pressure loss in the feed liquid can be decreased as compared with the aforementioned net member, but the quality and quantity of permeated liquid lower. Further, the pressure-loss decreasing effect produced is too small to be practical under a flow velocity condition of the feed liquid in the actual operation. Furthermore, this net member is expensive because it requires an advanced net-making technique.

A tricot member is generally used as a permeated liquid passage member 3, which has one or both sides thereof formed with a plurality of groove along which the liquid, having passed through a reverse osmosis membrane 2, is led to through-holes 1a of the hollow pipe 1. An example is shown in FIG. 4.

A permeated liquid passage member 3 of tricot shown in FIG. 4 has a plurality of parallel grooves 3a formed on one side thereof and is held between reverse osmosis membranes 1, 1. Inside the bag-shaped reverse osmosis membrane, the grooves 3a extend up to the outer surface of the hollow pipe 1 so that the liquid passing through the reverse osmosis membrane 2 may gather in the hollow pipe 1 via the grooves 3a.

When the operating pressure of an element comprising permeated liquid passage members of this structure is raised, the face of the reverse osmosis membrane 2 extending over the grooves 3a may be deformed and partially sink in the grooves 3a as indicated by imaginary lines. If it happens, the reverse osmosis membrane may be damaged by an upper edge of a groove 3a and may lose its performance. Further, the cross-sectional area of grooves 3a decreases, and resistance to the flow of permeated liquid increases, so that the quality and quantity of the permeated liquid lower.

To eliminate these problems, it is known to employ a permeated liquid passage member shown in FIG. 5 and having an improved pressure-resistance. This passage member is comprised of a porous sheet 3c of, for example, polyester interposed between the grooved surface of a tricot member 3 and a reverse osmosis membrane 2. The porous sheet is formed with through-holes 3d of 0.05 to 0.1 mm in diameter at spaces of about 0.1 to 20 mm.

With this structure of a permeated liquid passage member, the porous sheet 3c has sufficient rigidity even if it is thin, as long as the through-holes 3d are small in diameter and the distance between the through-holes 3d is large. However, the total through-hole area becomes small and the resistance to the permeating liquid flow is extremely large, so that a large pressure loss is produced. Thus, a sufficient element performance may not be attained.

When the total through-hole area is made large in order to decrease the resistance to the permeating liquid flow, the rigidity of the porous sheet decreases and the porous sheet needs to have a larger thickness. With the porous sheets having a larger thickness, the number of reverse osmosis membranes which can be arranged in the membrane element decreases and hence the total membrane area decreases. As a result, a sufficient quantity of permeated liquid cannot be obtained.

As described above, in the spiral reverse osmosis membrane element, the feed liquid passage member is required to suppress the occurrence of the concentration polarization on the membrane surface without causing the pressure loss in the feed liquid, and the permeated liquid passage member is required to ensure a desired quantity of permeated liquid without increasing the resistance to the flow of the permeating liquid.

An example of use of the spiral reverse osmosis membrane element in a seawater desalination system will be explained.

FIG. 6 is a schematic diagram showing an example of a conventional seawater desalination system. This system comprises, as basic elements, a reverse osmosis membrane module $M_0$ having, for example, spiral reverse osmosis membrane elements received in a pressure vessel, and a high-pressure pump $P_0$ arranged on the upstream side of the reverse osmosis membrane module $M_0$.

In this system, seawater 6 is taken in and fed to the high-pressure pump $P_0$. The seawater 6 pressurized by the high-pressure pump $P_0$ to a predetermined pressure is fed into the module $M_0$. In the module $M_0$, seawater desalination goes on by reverse osmosis separation, whereby the seawater 6 is separated into permeated water 6a of predetermined water quality and concentrated water 6b. The permeated water 6a is delivered to a place where it is used, and the concentrated water is discharged. To be noted, the desalting process further includes preliminary treatment for the taken-in seawater, such as scale inhibition and sterilization treatment, which is performed to prevent the deterioration of reverse osmosis membranes and ensure a steady system operation.

In this system, in order to sufficiently desalt seawater having a salt concentration of, for example, 3.5%, the seawater needs to be pressurized by the high-pressure pump $P_0$ at a pressure of at the lowest about 5.0 MPa before it is supplied to the module $M_0$. By doing this, the permeated water 6a is obtained from the module $M_0$ usually at a recovery rate of about 40%, and the balance of about 60% is the concentrated water 6b having a salt concentration of about 5.8%.

To lower the water production cost, it is very important to raise the recovery rate of the permeated water 6a.

For example, if the operating pressure of the high-pressure pump $P_0$ in the above system is regulated to be about 8.0 to 9.0 MPa, the permeated water 6a can be obtained from the seawater having a salt concentration of about 3.5% at a recovery rate of about 60%. The balance of about 40% is the concentrated water having a salt concentration of about 8.8%.

However, when the high-pressure pump $P_0$ is operated at the high operating pressure, problems described below occur.

First, the cost of operating the high-pressure pump increases, and the system needs the provision of attachments such as pressure pipes. Therefore, even if the permeated water is obtained at a recovery rate of 60%, the cost of operating the whole system increases. Accordingly, it is difficult to attain the object of decreasing the water production cost.

Second, when the elements in the module are operated under a high pressure of 8.0 to 9.0 MPa, too high effective pressure is exerted on the upstream-side elements in the module. As a result, an extremely large quantity of water passes through the reverse osmosis membranes, so that the membrane surfaces may be easily clogged with fouling substances. Further, in the downstream-side elements, on the reverse osmosis membrane surfaces adjacent to the feed liquid passage members, concentration polarization occurs easily and scale precipitates easily. Thus, the membrane surfaces are clogged easily and the pressure loss increases. Further, the reverse osmosis membranes are easily deformed on their sides adjacent to the permeated liquid passage members. As a result, the pressure loss increases and the quantity of the permeated water decreases.

OBJECTS AND SUMMARY OF THE INVENTION

An object of the present invention is to provide a spiral reverse osmosis membrane element which can suppress lowering of the performance caused by concentration polarization on the reverse osmosis membrane surface, reduce a pressure loss even under high-pressure operation, obtain permeated water of high quality at a high recovery rate, and is effective in seawater desalination.

Another object of the present invention is to provide a reverse osmosis membrane module having the above-mentioned reverse osmosis membrane element received in a pressure vessel.

Another object of the present invention is to provide an apparatus for reverse osmosis separation, having the above-mentioned reverse osmosis membrane module incorporated therein, and a method of operating the apparatus, and especially to provide an apparatus for and a method of reverse osmosis separation which can produce permeated water (pure water) of high quality at a high recovery rate with a small input of energy for operation when applied to seawater desalination, making it possible to lower the water production cost as compared with conventional apparatus and method.

DISCLOSURE OF THE INVENTION

In order to attain the above objects, the present invention provides a spiral reverse osmosis membrane element, wherein a plurality of bag-shaped reverse osmosis membranes, permeated liquid passage members arranged inside the reverse osmosis membranes, and a plurality of feed liquid passage members interposed between the reverse osmosis membranes are wound around an outer surface of a hollow pipe in a manner that only the interiors of the reverse osmosis membranes communicate with through-holes formed in the surface of the hollow pipe;

each of the feed liquid passage members is a mesh member having series of quadrilateral meshes formed by a plurality of linear members crossing each other;

two opposite cross-points out of four cross-points of each of the quadrilateral meshes are in line in parallel with an axial direction of the hollow pipe; and relations $2\ mm \leq X \leq 5\ mm$ and $X < Y \leq 1.8X$ are both satisfied where X denotes a distance between the cross-points in a direction perpendicular to the axial direction of the hollow pipe and Y denotes a distance between the cross-points in the axial direction of the hollow pipe.

This element is a basic element of the present invention, and it will be hereinafter referred to as "element A".

The present invention further provides an element A wherein the absolute value of an angle between a line, connecting the cross-points which are in line in the axial direction of the hollow pipe, and a mesh leg is within a range of 29 to 45°.

The present invention further provides an element A wherein each of the permeated liquid passage members comprises a woven or knitted fabric member of 0.15 to 0.4 mm in average thickness having a plurality of grooves formed on at least one side thereof, and a liquid-permeable fabric member of 0.05 to 0.2 mm in average thickness laid on the grooved surface of the woven or knitted fabric member.

This element is an element with which operation can be performed at a higher pressure, and it will be hereinafter referred to as "element B".

The present invention further provides a reverse osmosis membrane module wherein at least one element A or element B as described above is arranged in a pressure vessel having an inlet for feed liquid at one end and an outlet for resulting concentrated liquid at the other end thereof.

In a preferable reverse osmosis membrane module of the present invention, two or more elements as described above are arranged in the pressure vessel and connected in series with one another.

The present invention further provides an apparatus for reverse osmosis separation, comprising a feed liquid separating section comprising the reverse osmosis membrane modules connected in multistage form; and feed liquid pressurizing means arranged on an upstream side of the separating section.

In a preferable apparatus for reverse osmosis separation according to the present invention, the feed liquid pressurizing means is a turbocharger pressurizing pump.

The present invention provides, in particular, an apparatus for reverse osmosis separation of seawater wherein the feed liquid is seawater, the reverse osmosis membrane modules are connected in at least two-stage form, an electric high-pressure pump is arranged on an upstream side of a reverse osmosis membrane module in a precedent stage, a turbocharger pressurizing pump is arranged between the reverse osmosis membrane module in the precedent stage and a reverse osmosis membrane module in a subsequent stage, and a passage system for supplying concentrated liquid from the reverse osmosis membrane module in the precedent stage to a compressor section of the turbocharger pressurizing pump and for circulating concentrated liquid from the reverse osmosis membrane module in the subsequent stage to a turbine section of the turbocharger pressurizing pump is provided.

The present invention further provides a method of reverse osmosis separation, comprising a step of supplying feed liquid to the pressurizing means of the apparatus for reverse osmosis separation and pressurizing the feed liquid, and a step of supplying the pressurized feed liquid to the separating section of the apparatus and separating the pressurized feed liquid into permeated liquid and concentrated liquid.

The present invention provides, in particular, a method of reverse osmosis separation of seawater using an apparatus for reverse osmosis separation wherein the reverse osmosis membrane modules are connected in at least two-stage form, an electric high-pressure pump is arranged on an upstream side of a reverse osmosis membrane module in a precedent stage, and a turbocharger pressurizing pump is arranged between the reverse osmosis membrane module in the precedent stage and a reverse osmosis membrane module in a subsequent stage, comprising a first separating step of supplying pressurized seawater obtained by operating the electric high-pressure pump to the reverse osmosis membrane module in the precedent stage and separating the pressurized seawater into permeated water and concentrated water;

a second separating step of supplying the concentrated water produced in the first separating step to the reverse osmosis membrane module in the subsequent stage via a compressor section of the turbocharger pressurizing pump and separating the concentrated water further into permeated water and concentrated water; and a step of circulating the concentrated water produced in the second separating step to a turbine section of the turbocharger pressurizing pump.

First, the element A will be described.

The element A has a structure as shown in FIG. 1, wherein each feed liquid passage member 4 is a mesh member as described below.

The feed Liquid passage member 4 has a mesh structure as shown in FIG. 3 wherein a distance X between two opposite cross-points 7e, 7f out of four cross-points 7c, 7d, 7e, 7f is 2 to 5 mm and a distance Y between the other two opposite cross-points 7c, 7d satisfies a relation X<Y≦1.8X, the four cross-points 7c, 7d, 7e, 7f being formed by linear members 7a, 7b serving as mesh legs. The mesh structure is wound around an outer surface of a hollow pipe (not shown) in a manner that the cross-points 7c, 7d are in line in parallel with the axial direction of the hollow pipe, that is, in parallel with the flow direction 6 of feed liquid.

Thus, each quadrilateral mesh formed by linear members 7a, 7b is a diamond in shape whose longer axis extends in the flow direction 6 of feed liquid.

In the above described mesh structure wherein the cross-points 7c, 7d are in line in parallel with the flow direction of feed liquid, if X is larger than 5 mm and Y is large accordingly, a turbulent flow occurs less on the membrane surface of a reverse osmosis membrane, and therefore, concentration polarization occurs more easily. On the other hand, if X is smaller than 2 mm and Y is small accordingly, the feed liquid flowing along the meshes forms a turbulent flow more easily, and therefore, concentration polarization occurs less on the membrane surface of a reverse osmosis membrane. However, resistance to the feed liquid flow along the meshes increases, and hence a pressure loss produced in operating the element increases.

In this view, in the mesh structure of the present invention, the distance X is determined to be 2 to 5 mm, desirably to be 2.5 to 4.5 mm, and more desirably to be 3 to 4 mm.

In respect of the behavior of the feed liquid 6 flowing along the feed liquid passage member 4 having a mesh structure, the feed liquid 6 flows to the downstream side more or less following the mesh-forming linear members 7a, 7b.

If the feed liquid passage member 4 has meshes (diamond-shaped meshes) showing a relation Y<X, the feed liquid 6 tends to flow apart from the linear members 7a, 7b as shown in FIG. 7, so that the feed liquid may spread to the downstream side less widely. On the other hand, if the feed liquid passage member 4 has meshes (quadrilateral meshes) showing a relation Y>X, the feed liquid 6 flows more following the linear members 7a, 7b as shown in FIG. 8. Therefore, the feed liquid spreads more widely on the downstream side.

When the feed liquid spreads more widely over the mesh member toward the downstream side, the feed liquid is supplied more uniformly to the entirety of a reverse osmosis membrane. This also means that the feed liquid is mixed more quickly as it flows. Therefore, the frequency of occurrence of concentration polarization on the membrane surface of a reverse osmosis membrane decreases, and the resistance to the feed liquid flow decreases.

However, if the feed liquid passage member 4 has meshes (quadrilateral meshes) showing a relation Y>1.8X, the resistance to the feed liquid flow is too small, and not a turbulent flow but a streamline flow easily occurs on the membrane surface of a reverse osmosis membrane. As a result, concentration polarization occurs easily.

In this view, in the meshes of the present invention, the distances X and Y are determined to satisfy a relation x<Y≦1.8X, desirably a relation 1.1X≦Y≦1.7X, and more desirably a relation 1.2X≦Y≦1.5X.

Therefore, in the mesh structure, the minimum value of an angle (α) between a line connecting the cross-points 7c, 7d and the mesh leg 7a(7b) is $\tan^{-1}$ α=1/1.8 (29°), and the maximum value thereof is $\tan^{-1}$ α=1/1 (45°). Desirably, the angle (α) is determined to be from 30.5° to 42.5°, and more desirably to be from 23.5° to 40°.

It is desirable to measure the distance between cross-points at at least 10 places (n places), sum up the measured values, divide the sum (L) by n, and use the quotient (L/n) as the value of X or Y.

By determining the distance X to be within the range from X<Y≦1.8X, it is possible for the feed liquid to form an appropriate turbulent flow, whereby the occurrence of concentration polarization on the membrane surface is suppressed and the resistance to the feed liquid flow is restrained from increasing. Therefore, when feed liquid having a high solute concentration, for instance, is subjected to reverse osmosis separation, it is possible to decrease energy loss due to a pressure loss in the element and obtain permeated liquid of high quality.

If the mesh member having the above described mesh structure has an average thickness smaller than 0.5 mm, the linear velocity of the feed liquid on the membrane surface is large and a turbulent flow occurs easily. This makes it possible to suppress the occurrence of concentration polarization on the membrane surface of a reverse osmosis membrane. However, the pressure loss increases since the passage is liable to be clogged with fouling substances contained in the feed liquid.

If the mesh member has an average thickness larger than 1 mm, the linear velocity of the feed liquid on the membrane surface is small, so that concentration polarization tends to occur on the membrane surface of a reverse osmosis membrane.

In this view, in the present invention, it is desirable to determine the average thickness of the mesh member to be 0.5 to 1 mm. More desirably, the average thickness is determined to be 0.55 to 0.9 mm, and still further desirably to be 0.6 to 0.8 mm.

Here, the average thickness means a value (T/m) obtained by measuring the thickness of the mesh member at at least 10 places (m places) using a precision thickness gauge, summing up the measured values, and dividing the sum (T) by m.

By determining the average thickness of the mesh member to be within the above range, it is possible to provide an element wherein the feed liquid has an appropriate linear velocity on the membrane surface so that the occurrence of concentration polarization on the membrane surface may be suppressed more effectively, and the passage is restrained from being clogged with fouling substances so that a rapid increase of the pressure loss may be prevented. With this element, permeated liquid of high quality can be obtained in a stable operating condition for a long period of time.

Even if the average thickness (T/m) of the mesh member falls within the aforesaid range, the linear velocity of the feed liquid on the membrane surface can not be uniform in the case of the mesh member having an excessive thickness variation so that respective portions of the feed liquid passage on the same membrane surface vary in thickness. This is not favorable for the reverse osmosis membrane to develop uniform performance capability. It is desirable that a maximum variable range of thickness of the mesh member is between values that are 0.9 times and 1.1 times the average thickness of the mesh member, respectively.

If the thickness is within the above range, the difference in linear velocity of the feed liquid on the membrane surface caused by the difference in thickness of the mesh member is not so large that it may affect the performance capability of the reverse osmosis membrane. Thus, the reverse osmosis membrane can fully develop its capability.

Although the material for the mesh member is not limited to a special one, the mesh member is preferably made of a material which does not damage the reverse osmosis membrane disposed in contact with the mesh member and from which the mesh member can be made at a low cost. For example, polyester and polypropylene are desirable materials.

Next, the element B will be described.

The element B is an element including feed liquid passage members 4, which are the same as those of the element A, and permeated liquid passage members 3 having a structure described below. This element may be operated at a higher pressure.

As shown in FIG. 9, the permeated liquid passage member 8 comprises a woven-knitted fabric member 8b having a plurality of parallel grooves 8a formed at least on one side (in the drawing, only on one side) thereof, and a liquid-permeable fabric member 8c disposed on the grooved surface of the woven-knitted fabric member 8b. The whole permeated liquid passage member 8 is arranged in a bag-shaped reverse osmosis membrane 1, 1.

Here, the woven-knitted fabric member means a woven or knitted fabric member.

The average thickness of the woven-knitted fabric member is determined to be 0.15 to 0.4 mm. Here, the average thickness means the average of values of thickness of the woven-knitted fabric member measured at at least 10 places using a precision thickness gauge, like the average thickness of the above-mentioned feed liquid passage member 4.

If the average thickness is smaller than 0.15 mm, a large number of reverse osmosis membranes can be arranged in the element so that the total membrane area may be increased. However, the grooves 8a formed in the surface of the woven-knitted fabric member and serving as passages for permeated liquid cannot be made large. Therefore, resistance to the permeated liquid flow is large, and separation performance lowers.

If the average thickness of the woven-knitted fabric member 8b is determined to be larger than 0.4 mm, the above-mentioned problems are overcome. However, the number of reverse osmosis membranes that can be arranged in the element decreases, and hence the quantity of permeated liquid per element decreases. Further, a difficulty arises in spirally winding the woven-knitted fabric member around the outer surface of the hollow pipe since the rigidity of the fabric member increases.

By determining the average thickness of the woven-knitted fabric member 8b to be within the above-mentioned range, a sufficient size of the grooves 8a and a larger total membrane area in the element can be obtained at the same time. Therefore, a sufficient water permeate flow in the element is ensured. The desirable average thickness of the woven-knitted fabric member is 0.15 to 0.3 mm.

The grooves 8a formed at the surface of the woven-knitted fabric member 8b serve as passages for the permeated liquid and are covered with a liquid-permeable fabric member 8c (described later). If the grooves have a too large width, resistance to the permeated liquid flow may increase due to the presence of the liquid-permeable fabric member which may be deformed in high-pressure operation. Further, if the number of formed grooves is too large, the strength of the woven-knitted fabric member as a whole lowers. On the other hand, if the number of formed grooves is too small, the flow rate of permeated liquid decreases.

In this view, it is desirable that the grooves 8a are 0.1 to 0.2 mm in width and 0.05 to 0.2 mm in depth, and that the grooves are formed at a rate of 18 to 25 per 1 cm at the surface of the woven-knitted fabric member.

If the grooves are formed to satisfy the above requirements, the resistance to the permeated liquid flow is kept sufficiently small and the liquid-permeable fabric member is supported so as to be prevented from being deformed and sinking in the grooves even in high-pressure operation.

More desirably, the grooves 8a are 0.1 to 0.15 mm in width and 0.1 to 0.15 mm in depth, and the grooves are formed in the woven-knitted fabric member at a rate of 20 to 25 per 1 cm.

It is noted that the above-mentioned width, depth, and number of grooves are obtained by averaging values of the width, depth and number of grooves measured at at least 10 places on a photograph taken at a magnification of 10 to 50.

The woven-knitted fabric member 8b is not limited to any special kind as long as it satisfies the above structural requirements. Desirably, it is a tricot member because tricot has a high quality and can be produced at a low cost. There are various kinds of tricot such as double denbigh, queens cord, three-guide bar. Any kind of tricot may be used as long as it can provide passages for the permeated liquid and it is not deformed even in high-pressure operation.

The woven-knitted fabric member 8b may be made of any material as long as the material can hold a shape of a passage member and constituents of the material do not dissolve in the permeated liquid. For example, polyamide such as nylon, polyester, polyacrylonitrile, polyolefine such as polyethylene and polypropylene, polyvinyl chloride, polyvinylidene chloride, polyfluoroethylene, carbon material and the like can be used.

Among the above materials, polyester is desirable in that the woven-knitted fabric member, described later, of polyester shows a sufficient resistance to pressure even in high-pressure operation and is easy to work.

Preferably, the woven-knitted fabric member is subject to curing to increase its rigidity so that the fabric member may not be deformed in high-pressure operation.

Curing may be performed, for example, by impregnating the already shaped woven-knitted fabric member with liquid resin such as melanin or epoxy and by hardening it. If the woven-knitted fabric member is made of thermally fusible material, it may be subjected to thermal fusion wherein fibers constituting the fabric member are heated to fuse and fixed to each other.

Further, the woven-knitted fabric member may be subjected to calendering, so as to press minute irregularities on the surface of the fabric member due to irregular outer shapes of constitute fibers of the same. In this case, the woven-knitted fabric member has a very smooth and flat surface, and therefore the liquid-permeable fabric member and the reverse osmosis membrane which are in contact with the woven-knitted fabric member do not suffer local or uneven deformation even in high-pressure operation, whereby the durability and performance of the element are further improved.

The liquid-permeable fabric member 8c laid on the grooved surface of the woven-knitted fabric member 8b is not limited to any special kind. Non-woven fabric is desirable in that it has a sufficient liquid-permeability and shows good resistance to deformation in high-pressure operation.

Non-woven fabrics are classified into a so-called non-oriented non-woven fabric whose constituent fibers are not oriented, a non-woven fabric whose constituent fibers are oriented in a definite direction, and a non-woven fabric of an intermediate orientational nature. For the liquid-permeable fabric member 8c of the present invention, any of those three kinds of non-woven fabric may be used, but the non-woven fabric comprised of constituent fibers oriented in a definite direction is desirable in that it can provide a sufficient rigidity within a certain range of thickness.

When a non-woven fabric member comprised of oriented fibers is used, it is desirable to lay the non-woven fabric member on the grooved surface of the woven-knitted fabric member 8b in a manner that the oriented fibers cross the extending direction of the grooves 8a at right angles.

The non-woven fabric member arranged in this manner has anisotropy in strength and rigidity, so that it shows a larger strength in the direction perpendicular to the orientation of the constituent fibers when receiving deforming stress such as bending and warping. Therefore, even in high-pressure operation, the non-woven fabric member is restrained from being deformed and from sinking in the grooves 8a of the woven-knitted fabric member.

The average thickness of the liquid-permeable fabric member 8c is determined to be 0.05 to 0.2 mm. If the average thickness is smaller than 0.05 mm, the liquid-permeable fabric member 8c is deformed in high-pressure operation, and the resistance to the permeated liquid flow increases. If the average thickness is larger than 0.2 mm, the rigidity and the resistance to deformation improve, to be sure. However, the number of reverse osmosis membranes which can be arranged in the element decreases, and the total membrane area decreases accordingly. Further, the resistance to the permeated liquid flow increases. The desirable average thickness of the fabric member is 0.07 to 0.15 mm.

By determining the average thickness of the liquid-permeable fabric member 8c to be within the above range, the occurrence of deformation can be suppressed even in high-pressure operation, and a sufficient total membrane area in the element can be obtained at the same time.

It is noted that the above-mentioned average thickness is an average obtained by measuring the thickness of a fabric member at at least 10 places using a precision thickness gauge and averaging the measured values.

Although the liquid-permeable fabric member 8c is not limited in liquid-permeability, it is desirable that, in a case where the feel liquid is pure water, the liquid-permeable fabric 8c shows water permeability of 0.5 $m^3/m^2 \cdot MPa \cdot min$ or larger in terms of permeability coefficient at a temperature of 25° C. In that case, the resistance to the permeated liquid flow is small and the pressure loss decreases. More desirably, the liquid-permeable fabric 8c is a non-woven fabric member having a permeability coefficient of 0.8 $m^3/m^2 \cdot MPa \cdot min$ or larger relative to pure water of 25° C.

The liquid-permeable fabric member 8c may be made of any material as long as it does not entail substantial deformation even in high-pressure operation and its constituents do not dissolve in the permeated liquid. For example, polyamide such as nylon, polyester, polyacrylonitrile, polyolefine such as polyethylene and polypropylene, polyvinyl chloride, polyvinylidene chloride, polyfluoroethylene, carbon material and the like can be used.

Among the above materials, polyester is desirable because non-woven fabric of polyester is easy to work and is high in strength, and constituents of polyester dissolve little in the permeated liquid.

Next, the reverse osmosis membrane module of the present invention will be described.

FIG. 10 is a cross-sectional view of an example of a module M of the present invention. The module M includes spiral reverse osmosis membrane elements 10 each having a structure shown in FIG. 1. These elements 10 are received in a cylindrical pressure vessel 9a in a state that they are connected in series with one another. Each element 10 is formed by an element A or B described above.

An upstream-side sealing plate 9c having an inlet 9b for feed liquid 6 is liquid-tightly arranged at one end of the pressure vessel 9. At the other end of the pressure vessel 9, a downstream-side sealing plate 9c is arranged liquid-tightly, which has an outlet 9d for concentrated liquid produced by reverse osmosis separation.

A frame member 5 configured to allow liquid to pass therethrough is attached to one end of the element 10 disposed on the uppermost-stream side of the module M. As seen in area $J_1$ of FIG. 10, with use of a seal member 11, a liquid-tight structure is formed between the circumference of the frame member 5 and the inner wall of the pressure vessel 9a. An opening of a hollow pipe 1 of the element 10 is also sealed by a seal member 12.

As seen in area $J_2$ of FIG. 10, in the module M, an upstream-side element is liquid-tightly connected to a downstream-side element such that the openings of their respective hollow pipes 1,1 are joined to each other and a seal member 12 is wrapped around the joined portion of these elements. Liquid-tight structure is also formed between the circumference of the frame member 5 of the downstream-side element and the inner wall of the pressure vessel 9a with a seal member 11.

As seen in area $J_3$ of FIG. 10, the element 10 disposed on the downmost-stream side of the module M is liquid-tightly connected to the downstream-side sealing plate 9e such that the opening of a hollow pipe 1 is in communication with the outlet 9f for the permeated liquid, and a seal member 12 is arranged around the communicating portion between the hollow pipe and the outlet that is formed at the axial center of the downstream-side sealing plate 9e.

In the module M, a pressure loss occurring between the feed liquid inlet side and the outlet side varies depending on the number of elements arranged in the module M. As the number of elements arranged in the module increases, a larger pressure loss occurs and the operating efficiency lowers. The desirable number of elements received in the module M of the present invention is 1 to 10. The more desirable number is 1 to 8.

By determining the number of elements arranged in the module M to be within the above range, the pressure loss produced between the feed liquid inlet side and the outlet side can be decreased. Therefore, a drop in operating pressure due to the pressure loss can be decreased, whereby energy loss can be decreased and the permeated liquid can be obtained at a high efficiency.

The module M is supplied, through the inlet 9b, with the feed liquid 6 pressurized to a predetermined pressure. The feed liquid 6 flows into the element 10 through the frame member 5 configured to allow the liquid to pass therethrough. As the feed liquid flows to the downstream side, reverse osmosis separation of the feed liquid goes on. The permeated liquid 6a gathers in the hollow pipe 1, flows therethrough to the downstream side, and flows out from the outlet 9f.

The remaining feed liquid flows to the downstream side as concentrated liquid 6b, and finally flows out through an outlet 9d in the most concentrated state.

In this manner, the feed liquid 6 supplied into the module M under pressure is separated into the permeated liquid and the concentrated liquid. To be noted, the separated concentrated liquid has the same pressure energy as the feed liquid 6 has.

In the module M of the present invention, the elements A or B are arranged as the elements 10. Therefore, in the process of separation, concentration polarization occurs little on the membrane surfaces of the reverse osmosis membranes, and permeated liquid of a high quality can be obtained at a high recovery rate.

Particularly when the elements B are used as the elements 10, deformation of the permeated liquid passage members does not occur even in high-pressure operation, and therefore, the permeated liquid recovery rate further improves. The use of the module is favorable, for example, for seawater desalination because the water production cost lowers.

Next, the apparatus for and method of reverse osmosis separation according to the present invention will be described.

FIG. 11 is a block diagram showing, by way of example, the basic structure $S_0$ of the reverse osmosis separation apparatus of the present invention.

The apparatus $S_0$ comprises a feed liquid separating section $T_1$ and a feed liquid pressurizing means $P_1$ arranged on the upstream side of the separating section $T_1$. The feed liquid separating section $T_1$ has a multistage configuration comprised of modules M of the present invention shown in FIG. 10 and connected in parallel or in series with one another.

Feed liquid 6 such as seawater is supplied to the pressurizing means $P_1$ where it is pressurized to a predetermined pressure. The pressurized feed liquid is supplied to the modules M of the present invention which constitute the separating section $T_1$ in which reverse osmosis separation goes on, whereby the feed liquid is separated into permeated liquid 6a having predetermined quality and concentrated liquid 6b.

The pressure of the feed liquid 6 is represented by the sum of an effective pressure and the osmotic pressure of the feed liquid. The pressure varies depending on the kind of solute and the concentration of the feed liquid. To produce the permeated liquid by reverse osmosis separation efficiently, the effective pressure is desirably determined to be 0.5 to 7.0 MPa, and more desirably to be 1.5 to 6.0 MPa.

Taking an example where the feed liquid is seawater, the osmotic pressure of the feed seawater having a salt concentration of 3.5% is ordinarily 2.5 MPa, and it is preferable to determine the pressure of the feed seawater within a range of 3.0 to 9.5 MPa. By determining the pressure of the feed seawater to fall within this range, reverse osmosis separation by membranes can be performed efficiently. A more desirable pressure range is 4.0 to 8.5 MPa. At the pressure of the feed liquid falling within this range, permeated water of more favorable water quality can be obtained. More desirably, the pressure is within a range of 6.0 to 8.5 MPa.

Pressurizing means $P_1$ may be any means as long as it can pressurize the feed liquid 6 to a pressure necessary for reverse osmosis. For example, an electric high-pressure pump can be used. A hydraulic turbocharger pressurizing pump (described later) is favorable, because it can pressurize feed liquid and supply the same to a downstream-side module M. In addition, this pump can recover part of pressure energy of concentrated liquid produced in the module M and add the same to the feed liquid, whereby the pressure of the feed liquid is increased and utilized. Thus, the pressurizing pump of this type helps operate the apparatus $S_0$ at a high energy-efficiency and thereby lower the cost of operating the apparatus and the cost of producing permeated liquid.

Next, a favorable example will be explained where the apparatus for and method of reverse osmosis separation of the present invention is applied to seawater desalination.

FIG. 12 is a block diagram showing a favorable example $S_1$ of the reverse osmosis separation apparatus of the present invention for seawater treatment.

The apparatus $S_1$ as a whole has a two-stage form. Basically, the precedent stage comprises a first separating section $T_0$, which includes a plurality of reverse osmosis membrane modules $M_0$ connected in parallel or in series with one another, and an electric high-pressure pump $P_0$ arranged on the upstream side of the separating section $T_0$ and serving as a pressurizing means. The subsequent stage comprises a second separating section $T_1$ which comprises a plurality of reverse osmosis membrane modules M of the present invention as shown in FIG. 10 connected in parallel or in series with one another, and a turbocharger pressurizing pump $P_T$ arranged on the upstream side of the separating section $P_T$ and serving as a pressurizing means. The first separating section $T_0$ is connected to the pressurizing pump $P_T$.

The hydraulic turbocharger pressurizing pump $P_T$ used in the apparatus $S_1$ is of a type disclosed, for example, in Japanese Patent Preliminary Publication No. 1-294903. This pump is provided with a casing in which a turbine section and a pump section (compressor section) are directly and coaxially connected to each other. The pump section is operated to pressurize water supplied thereto, by using part of pressure energy of, for example, high-pressure brine water flowing into the turbine section.

The modules $M_0$ constituting the precedent stage may be either conventional modules actually used for seawater desalination or modules M of the present invention shown in FIG. 10.

Preferably, the number of modules $M_0$ constituting the precedent stage is 1 to 3 times, more preferably 1.5 to 2.5 times the number of modules $M_1$ constituting the subsequent stage.

By determining the number of modules in each stage so as to satisfy the above requirements, the quantity and pressure of seawater supplied to the modules in each stage can be made appropriate, thereby improving the quality of permeated water produced in the modules in each stage. At the same time, the efficiency of reverse osmosis separation is improved, whereby the permeated water can be obtained with less energy.

In the apparatus $S_1$, taken-in seawater 13 is pressurized to a predetermined pressure p by the electric high-pressure pump $P_0$, and is subjected to reverse osmosis separation by the modules $M_0$ in the first separating section $T_0$, whereby the seawater is separated into permeated water $6a_1$ and concentrated water $6b_1$ having a pressure p.

The concentrated water $6b_1$ flowing into the pump section $R_1$ of the pressurizing pump $P_T$ is pressurized to a pressure $p_1$ ($p_1$>p). The concentrated liquid $6b_1$ is supplied under pressure into the modules M of the present invention constituting the second separating section $T_1$ where the concentrated liquid is subjected to reverse osmosis separation by the modules M, to be separated into permeated water $6a_2$ and concentrated water $6b_2$ having a pressure $p_2$.

Since the osmotic pressure of the seawater 13 (having a salt concentration of 3.5%) is 2.5 MPa, the feed seawater has desirably a pressure p thereof falling within a range of 3.0 to 9.5 MPa. By determining the pressure p of the feed seawater to fall within this range, reverse osmosis separation by membranes can be performed efficiently. A more desirable range is 4.0 to 8.5 MPa. At the pressure p determined to be within this range, permeated water of more desirable quality can be obtained. A more desirable range is 6.0 to 8.5 MPa.

Since the feed seawater is concentrated in the modules in the preceding stage and its salt concentration increases, the osmotic pressure of the concentrated water $6b_1$ supplied to the modules M in the subsequent stage becomes higher. Thus, the pressure $P_1$ of the concentrated water $6b_1$ has a relation $p_1$>p relative to the pressure p in the precedent stage. The salt concentration of the concentrated water $6b_1$ is about 4.0 to 6.0%, and the osmotic pressure of the concentrated water $6b_1$ is about 3.0 to 5.0 MPa. To obtain permeated water of high quality efficiently in the modules M in the subsequent stage, it is desirable to determine the pressure $P_1$ to fall within a range of 5.0 to 12.0 MPa. A more desirable range is 7.0 to 11.0 MPa, and a still further desirable range is 8.0 to 10.0 MPa.

The concentrated water $6b_2$ is supplied under pressure to the turbine section $R_2$ of the pressurizing pump $P_T$, and part of the pressure energy thereof is added to the concentrated water $6b_1$ supplied to the pump section $R_1$. In other words, the pressure energy is partly consumed to pressurize the concentrated water $6b_1$ to the pressure $p_1$. Then, the concentrated water $6b_2$ is discharged. The total permeated water is equal to the sum of the permeated water $6a_1$ and the permeated water $6a_2$.

In the foregoing, the basic structure and operation of the apparatus $S_1$ have been described. Next, how the apparatus $S_1$ is actually operated will be described.

In operating the apparatus $S_1$, seawater 13 is taken in and subjected to preliminary treatment (described later) to prevent deterioration of membranes. Then, the seawater is pressurized to a predetermined pressure by the electric high-pressure pump $P_0$ and subjected to reverse osmosis separation.

Although any of deep sea water-intake, beach well water-intake and osmotic water-intake can be adopted for seawater intake, beach well or permeative water-intake is desirable because seawater of high clarity can be taken in, so that preliminary treatment (described later) may be simplified.

The preliminary treatment, which contemplates to remove fouling substances contained in the taken-in seawater, is implemented by coagulating sand-filtration wherein seawater is filtered after a coagulant such as ferric chloride, polychlorinated aluminum, aluminum sulfate or polychlorinated aluminum is added thereto. Alternatively, secondary coagulating filtration (polishing filtration) is adopted. For seawater taken in, for example, by permeative water-intake, ultrafiltration using ultrafiltration membranes or microfilms is implemented. These filtrations may be performed singly or in combination. It is desirable to make the fouling index (FI) of seawater lower than about 3 to 4.

By making the fouling index lower than about 3 to 4, fouling substances are restrained from depositing on the membrane surfaces in the reverse osmosis membrane elements, and therefore an increase in pressure loss and operating pressure can be prevented, whereby the permeated water can be produced stably for a long time.

For the preliminary treatment, a coagulating sand filter or a polishing filter is used, which is comprised of a pressure vessel filled with some kinds of sand disposed in layer and having different grain sizes, the filter being configured to subject feed seawater to filtration under a predetermined pressure. Ingredients and grain sizes of sand are chosen depending on the quality of seawater. Regarding the ingredients, sand having a low copper content is desirable, because if the copper content of sand is high, copper tends to dissolve in the seawater, react with chlorine, sulfate ions and the like, and deteriorate the reverse osmosis membranes.

As the ultrafiltration membrane and the microfiltration membrane, there are known a hollow fiber element or a spiral element. Either element can be used in the apparatus of the present invention. As the materials for the ultrafiltration membrane and the microfiltration membrane, there are known polyacrylonitrile, polysulfone, polyphenylene sulfidesulfone, polyethylene, polypropylene, polyamide, cellulose acetate and the like. Any of those materials can be used.

To destroy bacteria or inhibiting growth of bacteria in the seawater, sterilization treatment is performed by adding NaOCl, corresponding in quantity to the chlorine concentration of about 1 to 5 ppm. By regulating the chlorine concentration to be about 1 to 5 ppm, bacteria in the seawater can be sufficiently destroyed or inhibited from growing, and production of trihalomethan, caused by reaction of chlorine with organic substances contained in the seawater, can be kept low at the same time. If the chlorine concentration falls within the above range, deterioration of the reverse osmosis membranes due to oxidation caused by excessive chlorine residues can be suppressed, whereby the service life of the reverse osmosis membranes can be made longer. The treatment described above prevents deterioration of the reverse osmosis membranes.

To the seawater which has undergone the above treatment, sodiuum bisulfite (SBS), for example, is added to remove residual chlorine by neutralization, and sulfuric acid is added to regulate the pH of the seawater.

The aforementioned series of processes for the sterilization treatment may be performed continuously or intermittently, depending on how the seawater is contaminated with bacteria. For example, the intermittent treatment is performed once a day for about 1 to 5 hours, whereby bacteria can be destroyed or inhibited from growing. The interval and the duration of the treatment may be changed, depending on the degree of contamination of the seawater.

In order to destroy bacteria or inhibit growth of bacteria in the reverse osmosis membrane elements, a large quantity of sodium bisulfite (SBS) or sulfuric acid is added intermittently to the seawater to which sodium bisulfite (SBS) has been added. The quantity of sodium bisulfite (SBS) or sulfuric acid to be added and the duration and interval of addition of SBS may be determined depending on the degree of,contamination of the seawater. Preferably, sodium bisulfite (SBS) or sulphuric acid is added at a rate of 100 to 1000 ppm or it is added so that the pH of the seawater may be 4.0 or lower, and the addition is performed once a day, for 1 to 5 hours. By determining the quantity, duration and interval of addition of sodium bisulfite (SBS) or sulfuric acid so as to satisfy the above requirements, bacteria on the membrane surfaces can be efficiently destroyed or inhibited from growing. In this case, environmental conditions on the membrane surfaces are not constant but change intermittently, so that a problem of abnormal growth of particular bacteria may not occur. Hence, the apparatus can be operated for a long time with stability. It is more desirable that sodium bisulfite (SBS) or sulphuric acid is added at a rate of 300 to 600 ppm or it is added so that the pH of the seawater may be 2.6 or lower, and that the addition is performed once a day, for 2 to 4 hours.

An example will be explained below, in which seawater having a salt concentration of 3.5% is desalted by operating the apparatus $S_1$.

One hundred (100) parts of seawater 13 is taken in and subject to the above-described preliminary treatment, and is supplied to the electric high-pressure pump $P_0$. The seawater, pressurized to 6.0 MPa by the electric high-pressure pump $P_0$, is supplied to the first separating section $T_0$.

By the modules $M_0$ of the first separating section $T_0$, first reverse osmosis separation is performed, and 40 parts of fresh water $6a_1$ is obtained (recovery rate: 40%) and 60 parts of concentrated water $6b_1$ having a salt concentration of 5.8% is produced at the same time.

Sixty (60) parts of concentrated water $6b_1$ thus produced is supplied to the turbocharger pressurizing pump $P_T$ and then supplied to the second separating section $T_1$ where second reverse osmosis separation is performed by the modules M of the present invention, whereby 20 parts of fresh water $6a_2$ is obtained (recovery rate: 33%) and 40 parts of concentrated water $6b_2$ having a salt concentration of 8.8% is produced at the same time. The concentrated water $6b_2$ is supplied to the turbine section $R_2$ of the pressurizing pump $P_T$, and part of pressure energy thereof is added to the concentrated water $6b_1$ which comes into to the pump section R1. Thus, the concentrated water $6b_1$ is pressurized from 6.0 MPa to 8.5 MPa.

As a result of operating the apparatus $S_1$, 60 parts of fresh water and 40 parts of residual seawater are produced from 100 parts of seawater. The recovery rate is therefore 60%.

In the conventional apparatus shown in FIG. 6, the recovery rate is 40%. This means that 40 parts of fresh water and 60 parts of concentrated water (residual seawater) having a salt concentration of 4.8% are produced from 100 parts of seawater.

Provided that the same quantity of fresh water is to be produced, the apparatus $S_1$ of the present invention makes it possible to decrease an amount of seawater-intake, a discharge amount of residual seawater and salt content to about two-thirds, one half or less and about two-thirds, respectively, of those required or observed in the case of the conventional apparatus of FIG. 6. In other words, the apparatus $S_1$ of the present invention can produce a large quantity of water from the same amount of intake seawater with a small amount of operating energy, whereby water production costs can be reduced.

The permeability of the reverse osmosis membranes increases as the ambient temperature rises. Therefore, the permeated water recovery rate which the apparatus $S_1$ shows in summer is different from that in winter, that is, the recovery rate in summer is higher than in winter. To make the apparatus $S_1$ produce a constant quantity of permeated water irrespective of seasons, it is desirable to regulate the opening of valves, respectively provided in pipes for permeated water arranged on the downstream side of the separating sections $T_0$ and $T_1$, such that a predetermined back pressure is applied to the permeated water in the modules $M_0$ and M, whereby the effective pressure in reverse osmosis separation is regulated to accomplish a permeability adjustment.

As described above, the reverse osmosis membrane elements A and B, the reverse osmosis membrane module M, and the apparatuses $S_0$ and $S_1$ of the present invention are suitable for the purposes of obtaining permeated liquid from high concentrated liquid at a high recovery rate, such as seawater desalination. They are also applicable to other purposes of concentrating food such as vinegar, beer, alcohol and juice, concentrating industrial waste, and separating high concentrated liquid by reverse osmosis separation as in recovering valuables from industrial waste, to improve the efficiency and lower the cost of these treatments.

BEST MODE OF CARRYING OUT THE INVENTION

EXAMPLE 1

Comparative Example 1
(1) Feed Liquid Passage Members

Figure 1:
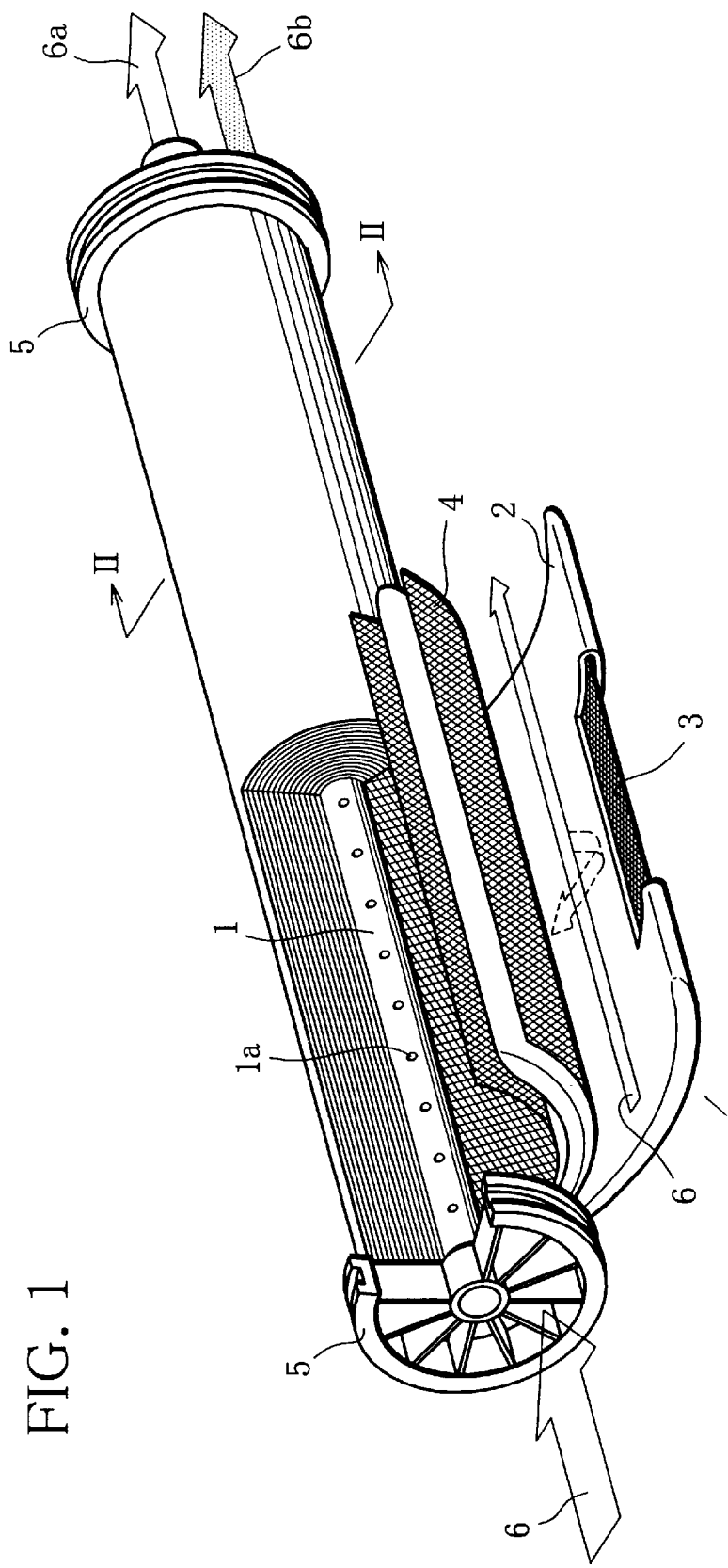
FIG. 1 is a perspective cutaway view of a spiral reverse osmosis membrane element.
Figure 2:
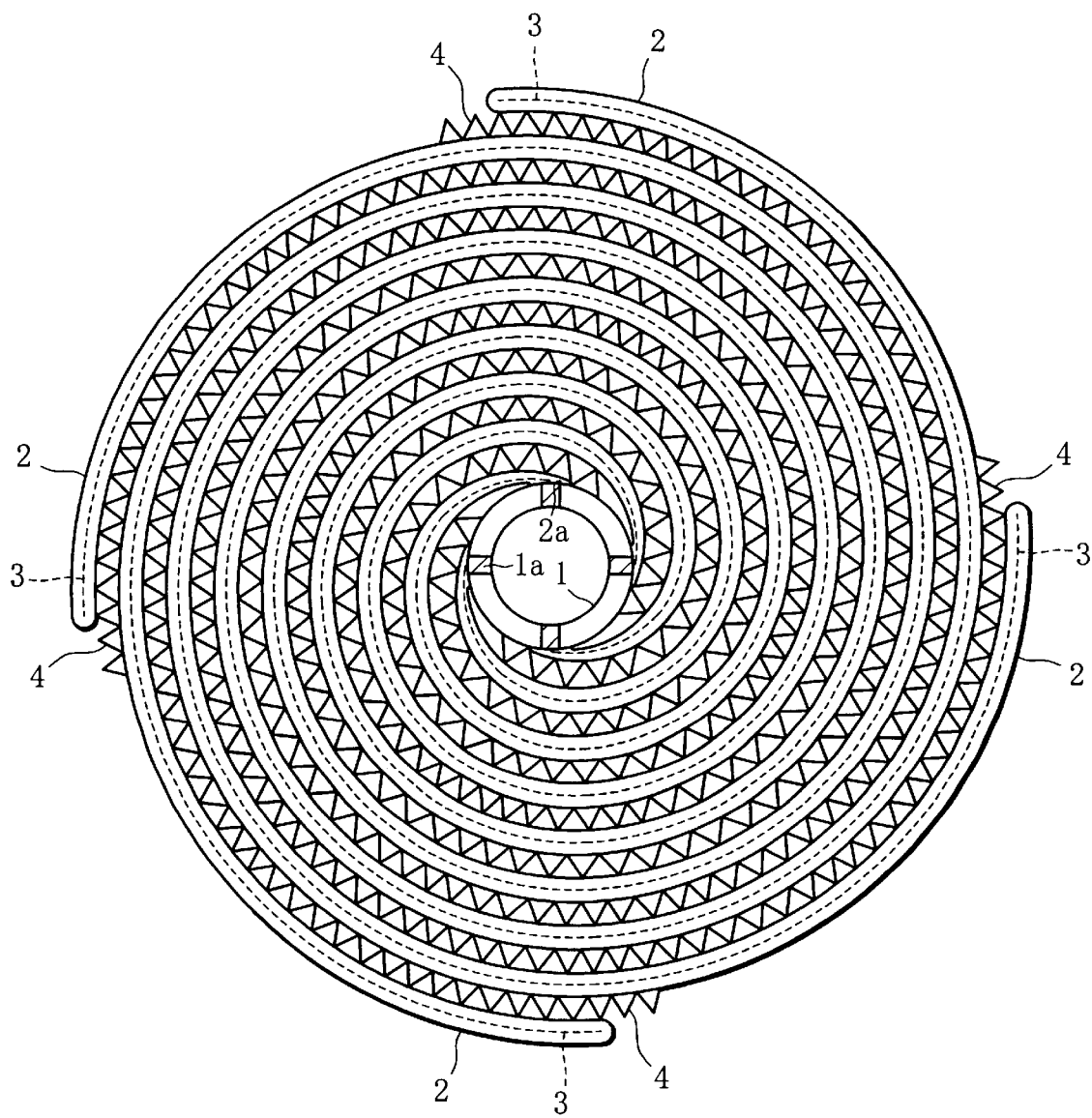
FIG. 2 is a cross-sectional view taken along line II—II of FIG. 1.
Figure 3:
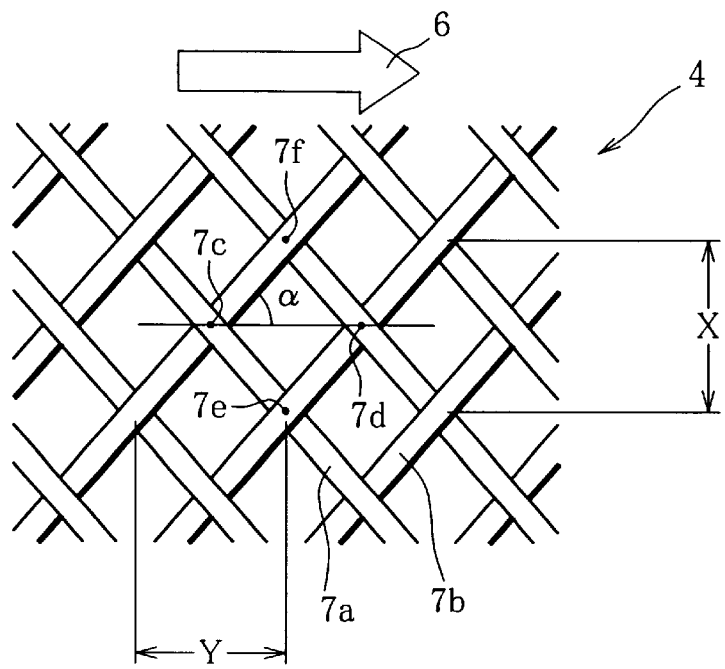
FIG. 3 is a plan view of a feed liquid passage member.
Figure 4:
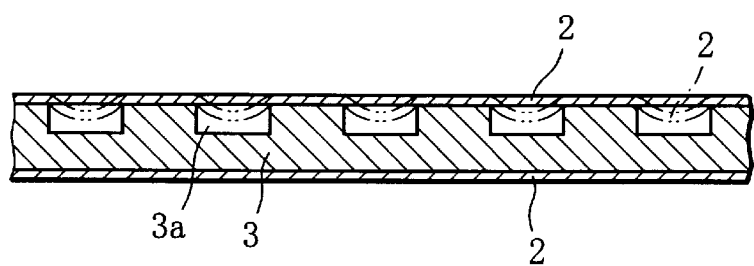
FIG. 4 is a cross-sectional view of a conventional permeated liquid passage member to be arranged in a reverse osmosis membrane.
Figure 5:
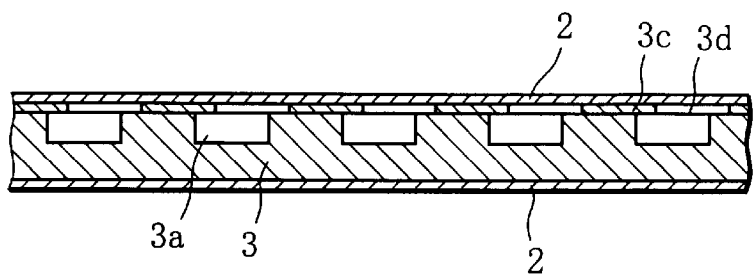
FIG. 5 is a cross-sectional view of another conventional permeated liquid passage member.
Figure 6:
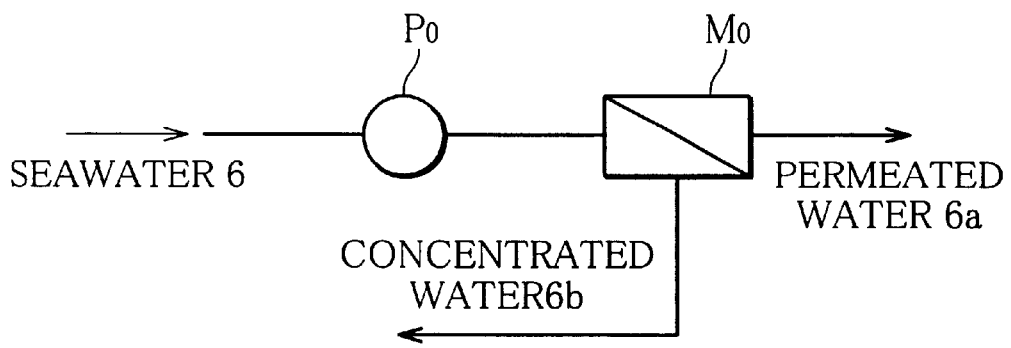
FIG. 6 is a schematic diagram showing by way of example a conventional apparatus for reverse osmosis separation.
Figure 7:
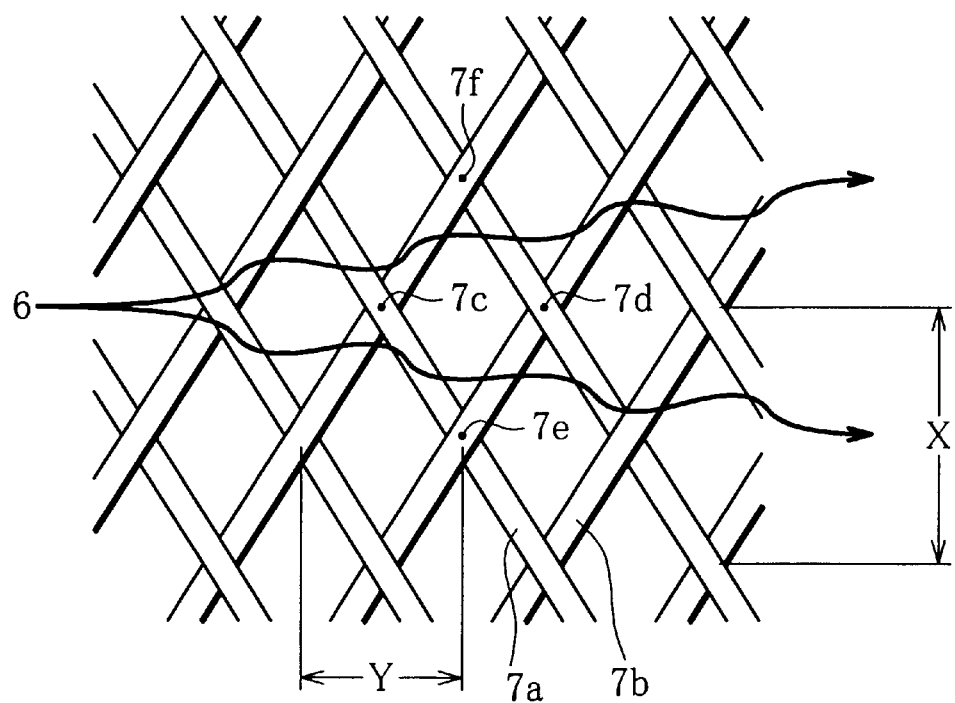
FIG. 7 is a sketch showing how feed liquid flows along a feed liquid passage member.
Figure 8:
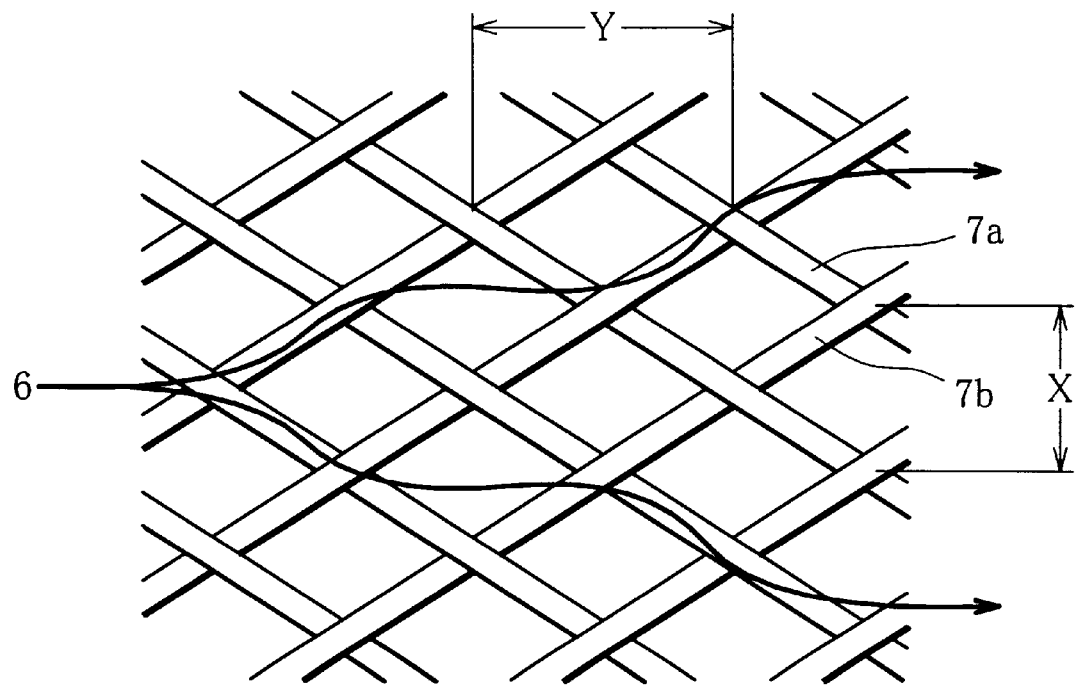
FIG. 8 is a sketch showing how feed liquid flows along another feed liquid passage member.

Net members a, b each having a net structure shown in FIG. 3 were prepared. As for the net member a, the average thickness was 0.7 mm, the distance (Y) between the cross-points 7c, 7d was 5 mm, and the angle α was 33°. As for the net member b, the average thickness was 0.7 mm, the distance (Y) between the cross-points 7c, 7d was 4 mm, and the angle α was 47°.

Each of the net members a, b was arranged on a parallel flat plate cell (passage width: 160 mm, passage length: 300 mm) in a manner that a line connecting the cross-points 7c, 7d extends in parallel with the passage direction. Water of 25° C. in temperature was caused to flow, and the flow velocity on the cell surface and the pressure loss produced between both ends of the cell were measured. The results are shown in FIG. 13.

Figure 13:
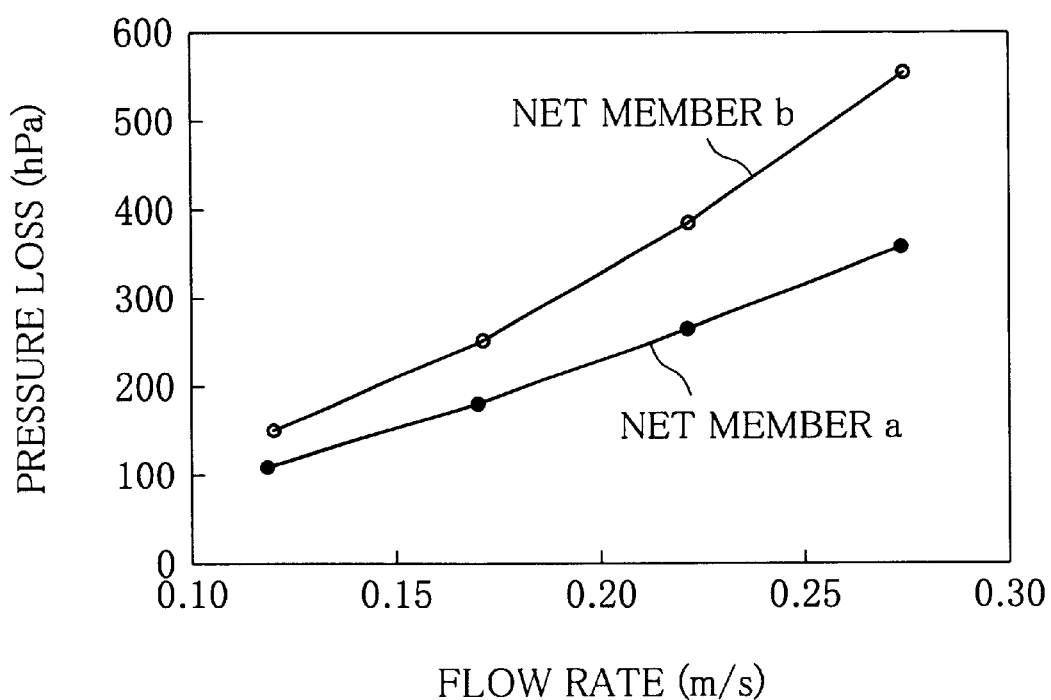
FIG. 13 is a graph showing the relation between flow velocity of feed liquid and pressure loss which a reverse osmosis membrane module shows when it is operated.

As apparent from FIG. 13, in the case of the net member a, the pressure loss is very small.

(2) Reverse Osmosis Membrane Elements and Modules

Bag-shaped reverse osmosis composite membranes serving as reverse osmosis membranes were prepared, each membrane made of a polysulfone porous support membrane having a surface thereof formed with an active thin layer of cross-linked aromatic polyamide and receiving therein a permeated liquid passage member of polyester tricot. The permeated liquid passage member was 0.25 mm in average thickness and was formed at one side with grooves of 0.15 mm in width and 0.10 mm in depth at a rate of 23 per 1 cm. The composite reverse osmosis membranes, between which the net member a or b serving as a feed liquid passage member was interposed, were wound around the outer surface of a hollow pipe, whereby two kinds of elements of 1 m in overall length and 200 mm in outer diameter were prepared. Of the two kinds of elements, the element using the net members a will be referred to as element a and the element using the net members b will be referred to as element b.

Each element a, b had an effective membrane area of 35 $m^2$.

Six (6) elements series-connected to one another were placed in a pressure vessel, to thereby form a module. The module having the elements a will be referred to as module a, and the module having the elements b will be referred to as module b.

(3) Module Performance

Figure 11:
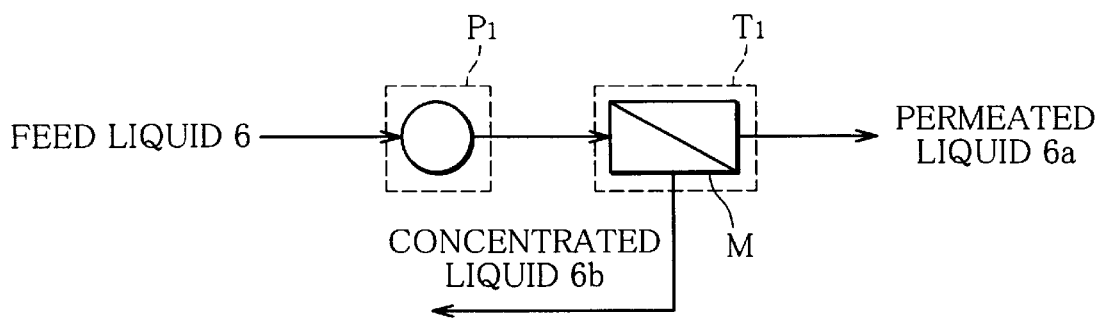
FIG. 11 is a diagram showing basic structure of an apparatus for reverse osmosis separation using modules of the present invention.

The modules a, b were each incorporated in an apparatus $S_0$ shown in FIG. 11. Aqueous solution of NaCl having a salt concentration of 0.05%, a pH of 6.5 and a liquid temperature of 25° C. was supplied to each module at a pressure of 0.7 MPa, and pressure loss, water production performance and NaCl concentration of permeated water were measured.

Each module a, b was operated at a recovery rate of 50%.

The results are as follows: The pressure loss was 1510 hPa in the module a and 2030 hPa in the module b. The water production performance was 156 $m^3$/day in the module a and 148 $m^3$/day in the module b. The NaCl concentration of permeated water was 4.6 ppm in the module a and 4.9 ppm in the module b.

With the module a having the elements a of the present invention, the pressure loss produced during operation can be decreased, the water production performance can be improved, and permeated water of higher quality can be obtained.

Examples 2 to 5

Comparative Examples 2 to 5

(1) Preparation of Reverse Osmosis Membranes and Feed Liquid Passage Members

A cross-linked aromatic polyamide composite membrane was prepared, which was flat membrane having the performance such that permeated water was obtainable at a rate of 0.85 $m^3/m^2$ day and at a salt rejection of 99.75% when a saline solution having a concentration of 3.5% was subjected to reverse osmosis separation, at a pressure of 5.5 MPa. The reverse osmosis separation was implemented by using a flat membrane evaluation cell provided with the composite membrane having an effective membrane area of 32$cm^2$. The above-mentioned composite membrane will be referred to as membrane I.

Another cross-linked aromatic polyamide composite membrane was prepared, which was a flat membrane having the performance such that permeated water was obtainable at a rate of 0.87 $m^3/m^2$·day and at a salt rejection of 99.72% when a saline solution having a concentration of 5.8% was subjected to filtration, at a pressure of 8.8 MPa, using a flat membrane evaluation cell having an effective membrane area of 32$cm^2$. This membrane will be referred to as membrane II.

As feed liquid passage members, net members of polyethylene having a net structure shown in FIG. 3 were prepared, wherein values of X, Y, angle α and the average thickness were as shown in table 1.

TABLE 1

|  | X (mm) | Y (mm) | Y/X | Angle α (°) | Average thickness (mm) |
| --- | --- | --- | --- | --- | --- |
| Fead liquid passage member I | 3 | 3.9 | 1.3 | 37.5 | 0.63 |
| Feed liquid passage member II | 3.5 | 4.52 | 1.29 | 37.8 | 0.7 |
| Feed liquid passage member III | 3.9 | 2.96 | 0.76 | 52.8 | 0.63 |
| Feed liquid passage member IV | 3.5 | 6.41 | 1.83 | 28.7 | 0.7 |
| Feed liquid passage member V | 5.5 | 6.6 | 1.2 | 39.8 | 0.7 |
| Feed liquid passage member VI | 1.8 | 2.7 | 1.5 | 33.7 | 0.7 |

(2) Assembly of Elements and Modules, Evaluation of Performance

A permeated liquid passage member comprised of a polyester tricot member and a polyester non-woven fabric member was prepared. The polyester tricot member was 0.20 mm in average thickness and formed at one side thereof with grooves of 0.15 mm in width and 0.10 mm in depth at a rate of 23 per 1 cm. The polyester non-woven fabric member, laid on the grooved side of the tricot member, was 0.10 mm in average thickness, and the permeability coefficient thereof relative to pure water at a temperature of 25° C. was 0.90 $m^3/m^2$·MPa·min.

Reverse osmosis membrane elements specified in table 2 were assembled by combining the permeated liquid passage members, the feed liquid passage members shown in table 1 and the above-mentioned membranes I, II in a manner shown in table 2.

Modules were assembled by arranging a corresponding one element in a pressure vessel of each module. Apparatuses $S_0$ as shown in FIG. 11 and each accommodating therein a corresponding one module were operated in the operating conditions shown in table 2 for 15 hours, and water permeate flow and salt rejection rate were measured. The results are shown in table 2 in a lump.

Regarding example 4 and comparative example 5, pressure loss was also measured. The results are shown in table 2.

TABLE 2

| | Kind of membrane | Kind of feed liquid passage member | Effective membrane area of element (m²) | Length of element (cm) | Concentration of saline solution (%) | Pressure (MPa) | Water permeate flow (m³/day) | Salt rejection (%) | Pressure loss (MPa) |
|---|---|---|---|---|---|---|---|---|---|
| | | | | | Operating conditions | | Performance | | |
| | | | Specification of element | | | | | | |
| Example 2 | Membrane I | Feed liquid passage member I | 2.5 | 50 | 3.5 | 5.5 | 1.72 | 99.70 | — |
| Example 3 | Membrane I | Feed liquid passage member II | 2.5 | 50 | 3.5 | 5.5 | 1.78 | 99.71 | — |
| Example 4 | Membrane II | Feed liquid passage member I | 28 | 100 | 5.8 | 8.8 | 20.2 | 99.68 | 0.0175 |
| Example 5 | Membrane II | Feed liquid passage member II | 28 | 100 | 5.8 | 8.8 | 21.5 | 99.70 | — |
| Comparative example 2 | Membrane I | Feed liquid passage member III | 2.5 | 50 | 3.5 | 5.5 | 1.34 | 99.5 | — |
| Comparative example 3 | Membrane I | Feed liquid passage member IV | 2.5 | 50 | 3.5 | 5.5 | 1.29 | 99.52 | — |
| Comparative example 4 | Membrane II | Feed liquid passage member V | 28 | 100 | 5.8 | 8.8 | 16.1 | 99.61 | — |
| Comparative example 5 | Membrane II | Feed liquid passage member IV | 28 | 100 | 5.8 | 8.8 | 16.8 | 99.63 | 0.028 |

As apparent from table 2, when the elements of the present invention are used, the water permeate flow increases, the salt rejection increases and the pressure loss much decreases.

EXAMPLES 6 TO 17

Comparative Examples 6 to 14

A cross-linked aromatic polyamide composite membrane was prepared, which was a flat membrane having the performance such that permeated water was obtainable at a rate of 0.85 m³/m²·day and at a salt rejection of 99.80% when a saline solution having a concentration of 6.0% was subjected to reverse osmosis separation, at a pressure of 9.0 MPa, using a flat membrane evaluation cell having an effective membrane area of 32cm².

Figure 9:
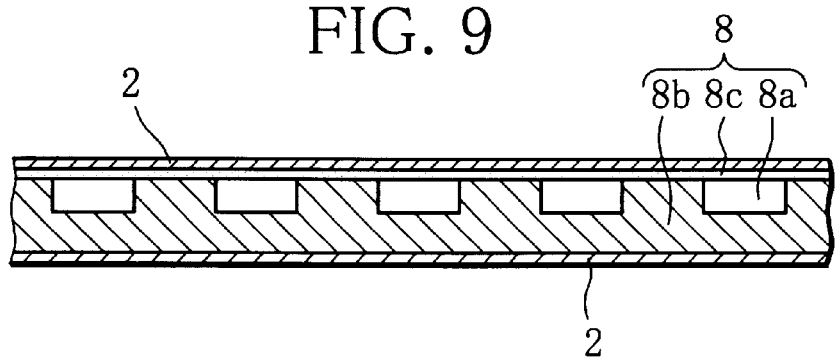
FIG. 9 is a cross-sectional view of a permeated liquid passage member used in an element of the present invention.
Figure 10:
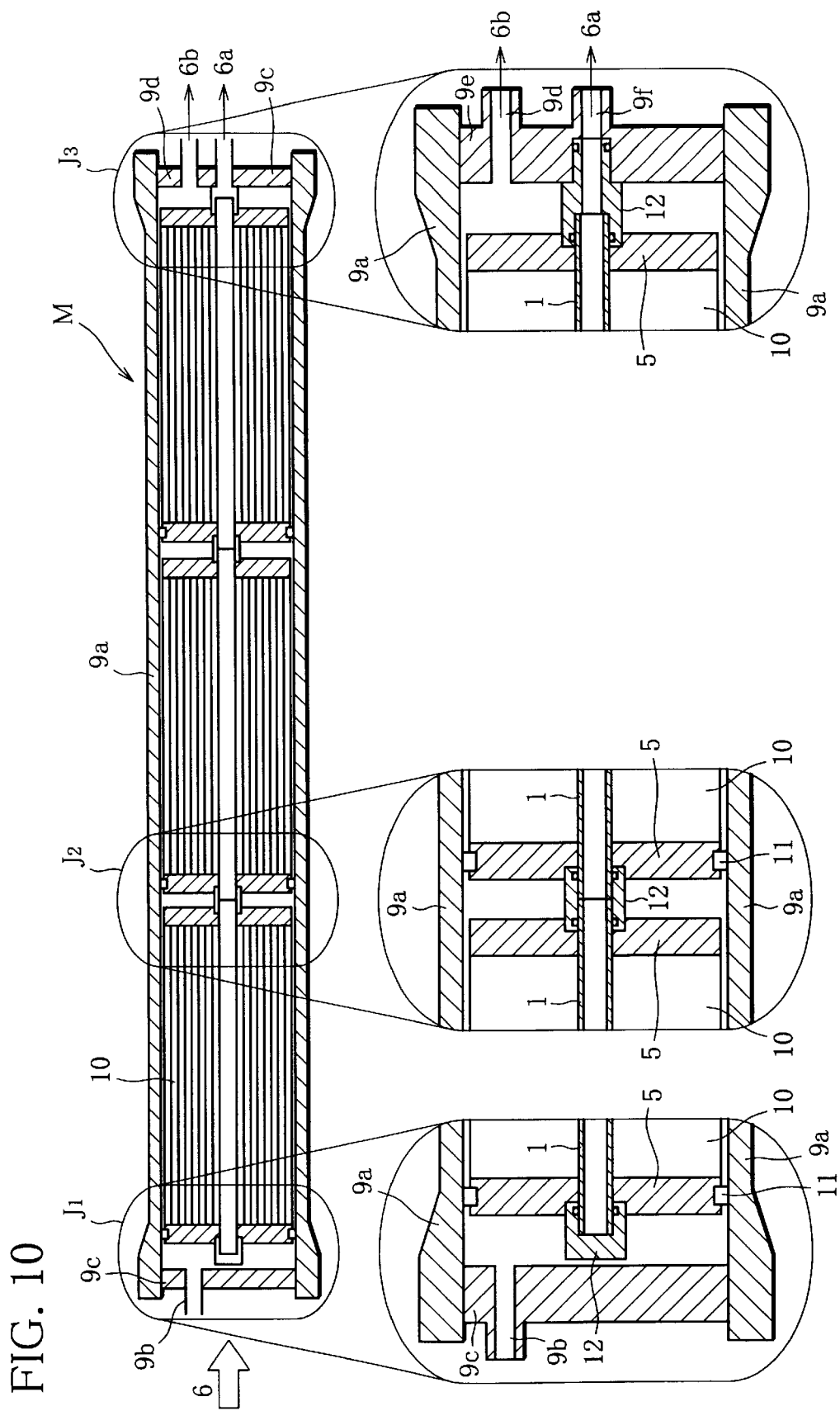
FIG. 10 is a cross-sectional view of a reverse osmosis membrane module including elements of the present invention.

Non-woven fabric members of polyester short fiber were prepared, each having an average thickness and a permeability coefficient relative to pure water (at 25° C.) as shown in table 3. Further, tricot members of single tricot having a double denbigh structure of polyester fiber were prepared, these tricot members having undergone curing by thermal fusion and surface calendering. The tricot members had each an average thickness as shown in table 3 and formed at one side with grooves specified in table 3. By laying each non-woven fabric member on the grooved surface of a tricot member corresponding thereto, various kinds of permeated liquid passage members having a cross-sectional structure shown in FIG. 9 were prepared.

Net members of polyethylene serving as feed liquid passage members were prepared, the net members having values of X, Y, angle α and the average thickness as shown in table 3.

By combining those members in a manner shown in table 3 and by winding each combined member around the outer surface of a hollow pipe of 32 mm in diameter, elements of 200 mm outer diameter and 1000 mm length were prepared. Each element had an effective membrane area as shown in table 3. Further, modules were assembled by arranging a corresponding one element in a pressure vessel of each module.

Apparatuses $S_0$ as shown in FIG. 11 and each incorporating therein a corresponding one module were operated using saline solution of 6.0% in concentration, 25° C. in liquid temperature and 6.5 in pH, on the operating conditions that the pressure was 9.0 MPa and the concentrated liquid flow rate was 80 L/min. After 24-hour operation, water permeate flow, salt rejection and pressure loss were measured for performance evaluation.

If the salt rejection was 99.7% or higher, the water permeate flow was 16.0m³/day or higher, and the pressure loss was 11.0 kPa or lower, performance evaluation ⊚ was given. If the salt rejection was 99.5 to 99.7%, the water permeate flow was 14.0 to 16.0 m³/day, and the pressure loss was 11.0 to 14.0 kPa, performance evaluation ○ was given. If the salt rejection was 99.0 to 99.5%, the water permeate flow was 12.0 to 14.0 m³/day, and the pressure loss was 14.0 to 17.0 kPa, performance evaluation Δ was given. In the other cases, performance evaluation × was given.

The results are shown in table 3.

TABLE 3-1

| | | | | Example No. | | | | | |
|---|---|---|---|---|---|---|---|---|---|
| | | | | 6 | 7 | 8 | 9 | 10 | 11 |
| Permeated liquid passage member | Non-woven fabric member | Average thickness (mm) | | 0.10 | 0.10 | 0.10 | 0.09 | 0.07 | 0.18 |
| | | Pure water permeability coefficient (m³/m²XMPaXmin, 25°) | | 0.90 | 0.90 | 0.90 | 0.98 | 1.20 | 0.65 |
| | Tricot member | Average thickness (mm) | | 0.20 | 0.20 | 0.17 | 0.37 | 0.20 | 0.20 |
| | | Groove | Width (mm) | 0.15 | 0.15 | 0.10 | 0.20 | 0.15 | 0.15 |
| | | | Depth (mm) | 0.10 | 0.10 | 0.07 | 0.18 | 0.10 | 0.10 |
| | | | Number (/cm) | 23 | 23 | 25 | 18 | 23 | 23 |

TABLE 3-1-continued

|  |  | Example No. | | | | | |
| --- | --- | --- | --- | --- | --- | --- | --- |
|  |  | 6 | 7 | 8 | 9 | 10 | 11 |
| Feed liquid passage member | Average thickness (mm) | 0.63 | 0.70 | 0.63 | 0.63 | 0.63 | 0.63 |
|  | X (mm) | 3.0 | 3.5 | 3.0 | 3.0 | 3.0 | 3.0 |
|  | Y (mm) | 3.9 | 4.5 | 3.9 | 3.9 | 3.9 | 3.9 |
|  | Y/X | 1.30 | 1.29 | 1.30 | 1.30 | 1.30 | 1.30 |
|  | Angle α (°) | 37.5 | 37.8 | 37.5 | 37.5 | 37.5 | 37.5 |
| Effective membrane area of element ($m^2$) |  | 30.2 | 28.0 | 30.2 | 26.9 | 31.4 | 27.8 |
| Module performance | Salt rejection (%) | 99.75 | 99.77 | 99.75 | 99.72 | 99.62 | 99.70 |
|  | Water permeate flow ($m^3$/day) | 17.8 | 16.2 | 17.4 | 15.9 | 18.2 | 16.0 |
|  | Pressure loss (kPa) | 10.3 | 8.9 | 10.1 | 10.8 | 9.8 | 10.2 |
|  | Evaluation | ⊚ | ⊚ | ⊚ | ○ | ○ | ⊚ |

TABLE 3-2

|  |  |  | Example No. | | | | | |
| --- | --- | --- | --- | --- | --- | --- | --- | --- |
|  |  |  | 12 | 13 | 14 | 15 | 16 | 17 |
| Permeated liquid passage member | Non-woven fabric member | Average thickness (mm) | 0.10 | 0.10 | 0.10 | 0.09 | 0.10 | 0.07 |
|  |  | Pure water permeability coefficient ($m^3/m^2 \times MPa \times min, 25°$) | 0.90 | 0.90 | 0.90 | 0.98 | 0.90 | 1.20 |
|  | Tricot member | Average thickness (mm) | 0.20 | 0.20 | 0.20 | 0.20 | 0.20 | 0.17 |
|  |  | Groove Width (mm) | 0.15 | 0.15 | 0.15 | 0.15 | 0.15 | 0.10 |
|  |  | Depth (mm) | 0.10 | 0.10 | 0.10 | 0.10 | 0.10 | 0.07 |
|  |  | Number (/cm) | 23 | 23 | 23 | 23 | 23 | 25 |
| Feed liquid passage member |  | Average thickness (mm) | 0.65 | 0.64 | 0.71 | 0.69 | 0.53 | 0.92 |
|  |  | X (mm) | 2.3 | 4.6 | 3.5 | 3.1 | 2.7 | 4.5 |
|  |  | Y (mm) | 3.2 | 5.7 | 3.9 | 5.3 | 3.5 | 5.8 |
|  |  | Y/X | 1.40 | 1.23 | 1.11 | 1.71 | 1.30 | 1.29 |
|  |  | Angle α (°) | 35.5 | 39.1 | 42.0 | 30.3 | 37.5 | 37.8 |
| Effective membrane erea of element ($m^2$) |  |  | 29.2 | 29.0 | 27.5 | 28.8 | 32.2 | 25.7 |
| Module performance |  | Salt rejection (%) | 99.75 | 99.66 | 99.65 | 99.71 | 99.74 | 99.64 |
|  |  | Water permeate flow ($m^3$/day) | 17.1 | 16.8 | 16.1 | 16.5 | 19.0 | 15.0 |
|  |  | Pressure loss (kPa) | 9.1 | 8.5 | 9.4 | 9.0 | 11.2 | 7.6 |
|  |  | Evaluation | ⊚ | ○ | ○ | ⊚ | ○ | ○ |

TABLE 3-3

|  |  |  | Comparative example No. | | | | |
| --- | --- | --- | --- | --- | --- | --- | --- |
|  |  |  | 6 | 7 | 8 | 9 | 10 |
| Permeated liquid passage member | Non-woven fabric member | Average thickness (mm) | Absent | 0.24 | 0.04 | 0.10 | 0.10 |
|  |  | Pure water permeability coefficient ($m^3/m^2 \times MPa \times min, 25°$) | — | 0.33 | 2.15 | 0.90 | 0.90 |
|  | Tricot member | Average thickness (mm) | 0.20 | 0.20 | 0.37 | 0.12 | 0.20 |
|  |  | Groove Width (mm) | 0.15 | 0.15 | 0.20 | 0.23 | 0.15 |
|  |  | Depth (mm) | 0.10 | 0.10 | 0.18 | 0.05 | 0.10 |
|  |  | Number (/cm) | 23 | 23 | 18 | 20 | 23 |
| Feed liquid passage member |  | Average thickness (mm) | 0.70 | 0.70 | 0.70 | 0.70 | 0.70 |
|  |  | X (mm) | 3.5 | 3.5 | 3.5 | 3.5 | 1.8 |
|  |  | Y (mm) | 4.5 | 4.5 | 4.5 | 4.5 | 2.7 |
|  |  | Y/X | 1.29 | 1.29 | 1.29 | 1.29 | 1.50 |
|  |  | Angle α (°) | 37.8 | 37.8 | 37.8 | 37.8 | 33.7 |
| Effective membrane erea of element ($m^2$) |  |  | 30.3 | 25.4 | 25.3 | 30.1 | 28.1 |
| Module performance |  | Salt rejection (%) | 90.32 | 99.45 | 97.54 | 99.38 | 99.62 |
|  |  | Water permeate flow ($m^3$/day) | 18.6 | 13.3 | 14.8 | 15.9 | 14.8 |
|  |  | Pressure loss (kPa) | 9.5 | 9.5 | 9.7 | 9.7 | 15.7 |
|  |  | Evaluation | x | Δ | x | Δ | Δ |

TABLE 3-4

|  |  |  | Comparative example No. | | | |
|---|---|---|---|---|---|---|
|  |  |  | 11 | 12 | 13 | 14 |
| Permeated liquid passage member | Non-woven fabric member | Average thickness (mm) | 0.10 | 0.10 | 0.10 | 0.07 |
|  |  | Pure water permeability coefficient ($m^3/m^2 \times MPa \times min$, 25°) | 0.90 | 0.90 | 0.90 | 1.20 |
|  | Tricot member | Average thickness (mm) | 0.20 | 0.20 | 0.20 | 0.17 |
|  |  | Groove Width (mm) | 0.15 | 0.15 | 0.15 | 0.10 |
|  |  | Depth (mm) | 0.10 | 0.10 | 0.10 | 0.07 |
|  |  | Number (/cm) | 23 | 23 | 23 | 25 |
| Feed liquid passage member |  | Average thickness (mm) | 0.70 | 0.42 | 0.63 | 1.25 |
|  |  | X(mm) | 5.5 | 3.2 | 3.9 | 4.5 |
|  |  | Y(mm) | 6.6 | 4.3 | 3.0 | 5.4 |
|  |  | Y/X | 1.20 | 1.34 | 0.76 | 1.20 |
|  |  | Angle α(°) | 39.8 | 36.7 | 52.8 | 39.8 |
| Effective membrane area of element ($m^2$) |  |  | 27.8 | 36.2 | 30.1 | 20.5 |
| Module performance |  | Salt rejection (%) | 99.21 | 96.60 | 99.11 | 99.30 |
|  |  | Water permeate flow ($m^3$/day) | 15.1 | 18.0 | 16.5 | 11.2 |
|  |  | Pressure loss (kPa) | 9.5 | 21.2 | 14.9 | 6.8 |
|  |  | Evaluation | Δ | x | Δ | x |

As apparent from Table 3, the element of the present invention and the module using the same make it possible to produce permeated water of high quality with a small pressure loss at a high water permeate flow even at a high operating pressure of 9.0 MPa.

EXAMPLES 18 TO 22

Comparative Examples 15 to 17

Elements specified in table 4 were prepared in the same way as the elements of examples 6 to 17. Then modules were assembled using the elements.

Apparatuses $S_0$ as shown in FIG. 11 and each accommodating therein a corresponding one module were operated, using the seawater taken in off the coast of Ehime and concentrated in advance to an extent that it had an total dissolved solusion content of 6.0% by weight and an FI of 3.0 to 4.0, on the operating conditions that the pressure was 9.0 MPa, pH was 6.5 and the concentrated water flow rate was 80 L/min. After 2000-hour operation, salt rejection, water permeate flow, and pressure loss were measured. Rate of retention in salt rejection, rate of retention in water permeate flow, and rate of change in pressure loss were calculated from measured values in accordance with the following expressions:

Rate of retention in salt rejection (%)=100×salt rejection after 2000-hour operation/initial salt rejection Rate of retention in water permeate flow (%)=100×water permeate flow after 2000-hour operation/initial water permeate flow Rate of change in pressure loss (%)=100×pressure loss after 2000 hour-operation/initial pressure loss The results are shown in table 4 in a lump.

TABLE 4-1

|  |  |  | Example No. | | | | |
|---|---|---|---|---|---|---|---|
|  |  |  | 18 | 19 | 20 | 21 | 22 |
| Permeated liquid passage member | Non-woven fabric member | Average thickness (mm) | 0.10 | 0.10 | 0.09 | 0.10 | 0.07 |
|  |  | Pure water permeability coefficient ($m^3/m^2 \times MPa \times min$, 25°) | 0.90 | 0.90 | 0.98 | 0.90 | 1.20 |
|  | Tricot member | Average thickness (mm) | 0.20 | 0.20 | 0.20 | 0.20 | 0.20 |
|  |  | Groove Width (mm) | 0.15 | 0.15 | 0.15 | 0.15 | 0.15 |
|  |  | Depth (mm) | 0.10 | 0.10 | 0.10 | 0.10 | 0.10 |
|  |  | Number (/cm) | 23 | 23 | 23 | 23 | 23 |
| Feed liquid passage member |  | Average thickness (mm) | 0.70 | 0.63 | 0.53 | 0.92 | 0.63 |
|  |  | X (mm) | 3.5 | 3.0 | 2.7 | 4.5 | 3.0 |
|  |  | Y (mm) | 4.5 | 3.9 | 3.5 | 5.8 | 3.9 |
|  |  | Y/X | 1.29 | 1.30 | 1.30 | 1.29 | 1.30 |
|  |  | Angle α (°) | 37.8 | 37.5 | 37.5 | 37.8 | 37.5 |
| Effective membrane area of element ($m^2$) |  |  | 28.0 | 30.2 | 32.2 | 25.0 | 31.4 |
| Rate of retention (rate of change) in performance |  | Rate of retention in salt rejection (%) | 99.8 | 99.7 | 99.3 | 99.3 | 98.8 |
|  |  | Rate of retention in water permeate flow (%) | 97.8 | 98.0 | 98.3 | 97.7 | 97.8 |
|  |  | Rate of change in pressure loss (%) | 1.1 | 1.1 | 1.3 | 1.0 | 1.1 |

TABLE 4-2

|  |  |  | Comparative example No. | | |
|---|---|---|---|---|---|
|  |  |  | 15 | 16 | 17 |
| Permeated liquid passage member | Non-woven fabric member | Average thickness (mm) | 0.10 | 0.04 | 0.10 |
|  |  | Pure water permeability coefficient ($m^3/m^2 \times MPa \times min$, 25°) | 0.90 | 2.15 | 0.90 |
|  | Tricot member | Average thickness (mm) | 0.20 | 0.37 | 0.20 |
|  |  | Groove Width(mm) | 0.15 | 0.20 | 0.15 |
|  |  | Depth(mm) | 0.10 | 0.18 | 0.10 |
|  |  | Number(/cm) | 23 | 18 | 23 |
| Feed liquid passage member |  | Average thickness (mm) | 0.70 | 0.70 | 0.42 |
|  |  | X(mm) | 1.8 | 3.5 | 3.2 |
|  |  | Y(mm) | 2.7 | 4.5 | 4.3 |
|  |  | Y/X | 1.50 | 1.29 | 1.34 |
|  |  | Angle α(°) | 33.7 | 37.8 | 36.7 |
| Effective membrane area of element ($m^2$) |  |  | 28.1 | 25.3 | 36.2 |
| Rate of retention (rate of change) in performance | Rate of retention in salt rejection (%) |  | 95.5 | 86.3 | 91.3 |
|  | Rate of retention in water permeate flow (%) |  | 87.9 | 98.2 | 81.5 |
|  | Rate of change in pressure loss (%) |  | 1.7 | 1.1 | 2.1 |

As apparent from table 4, changes in pressure loss, in water permeate flow and in salt rejection are small in the module using the element of the present invention, even if the module is operated for a long time using the seawater which has a high salt concentration and which contains fouling substances corresponding to an FI of about 3.0 to 4.0. Therefore, the module M can be operated with stability for a long time on the conditions that the pressure is high and the concentration is high.

EXAMPLES 23, 24

Comparative Examples 18, 19

Figure 12:
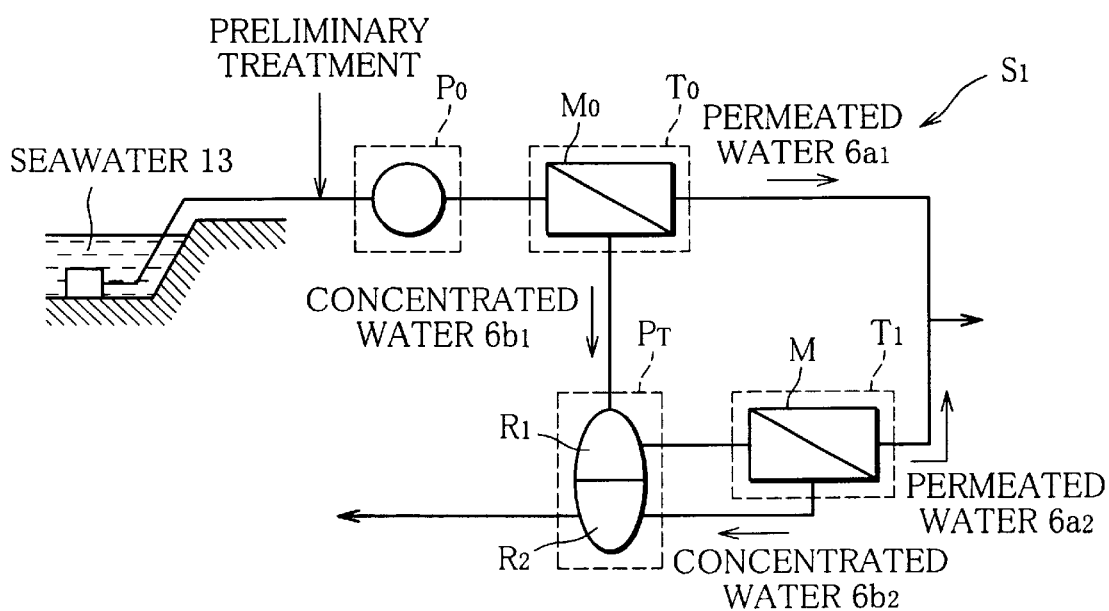
FIG. 12 is a diagram showing basic structure of an apparatus for reverse osmosis separation of seawater according to the present invention.

Elements specified in table 5 were prepared in the same way as the elements of examples 6 to 17. Modules were each assembled by placing six elements associated therewith in a pressure vessel of each module, with these elements connected in series with one another. Each module was incorporated in a second stage of an apparatus $S_0$ shown in FIG. 12 and having a first stage accommodating therein a conventional reverse osmosis membrane module.

Seawater was taken in off the coast of Ehime, and ferric chloride, serving as a coagulant, was added thereto continuously at a rate of 5 ppm. For fungicidal treatment for the seawater, sodium bisulfate (SBS) was added intermittently at a rate of 3 ppm once a day, for two hours. Then the seawater was subjected to filtration using a coagulating sand filter and a polishing filter to have a FI of 3 to 4.

To the seawater having undergone the above preliminary treatment, sodium bisulfite (SBS) was added intermittently once a day, for two hours in order to eliminate chlorine. Further, for fungicidal treatment for the reverse osmosis membrane elements, sulfuric acid was added to the seawater intermittently once a day, for two hours, so that the pH of the seawater may be 2.5. Using the seawater thus prepared, the apparatus was operated, wherein the operating pressure in the first stage was regulated to be 6.5 MPa so that the recovery rate in the first stage may be 40%, and the operating pressure in the second stage was so regulated that the recovery rate in the second stage may be 33%. After 100-hour operation performed on the condition that the pH was 6.5, water quality of permeated water, operating pressure, and pressure loss were measured.

The results are shown in table 5 in a lump.

As is apparent from table 5, when a multistage-type seawater desalination apparatus is operated at a high recovery rate of about 60%, the use of a module having a subsequent stage incorporating the elements of the present invention makes it possible to produce water of high quality on the conditions that the pressure is high and the concentration is high, without requiring too high operating pressure and without producing too large pressure loss.

TABLE 5

|  |  |  | Example No. | | Comparative example No. | |
|---|---|---|---|---|---|---|
|  |  |  | 23 | 24 | 18 | 19 |
| Permeated liquid passage member | Non-woven fabric member | Average thickness (mm) | 0.10 | 0.18 | 0.07 | 0.10 |
|  |  | Pure water permeability coefficient ($m^3/m^2 \times MPa \times min$, 25°) | 0.90 | 0.65 | 1.20 | 0.90 |
|  | Tricot member | Average thickness (mm) | 0.20 | 0.20 | 0.17 | 0.20 |
|  |  | Groove Width (mm) | 0.15 | 0.15 | 0.10 | 0.15 |
|  |  | Depth (mm) | 0.10 | 0.10 | 0.07 | 0.10 |
|  |  | Number (/cm) | 23 | 23 | 25 | 23 |
| Feed liquid passage member |  | Average thickness (mm) | 0.70 | 0.63 | 1.25 | 0.70 |
|  |  | X(mm) | 3.5 | 3.0 | 4.5 | 1.8 |
|  |  | Y(mm) | 4.5 | 3.9 | 5.4 | 2.7 |
|  |  | Y/X | 1.29 | 1.30 | 1.20 | 1.50 |
|  |  | Angle α(°) | 37.8 | 37.5 | 39.8 | 33.7 |
| Effective membrane area of element ($m^2$) |  |  | 28.0 | 27.8 | 20.5 | 28.1 |
| Performance |  | Total dissolved solution content of permeated liquid (ppm) | 120 | 105 | 362 | 348 |
|  |  | Operating pressure in second stage (MPa) | 8.4 | 8.5 | 8.5 | 9.6 |
|  |  | Pressure loss (kPa) | 140 | 162 | 102 | 231 |

INDUSTRIAL APPLICABILITY

The spiral reverse osmosis membrane element of the present invention and the reverse osmosis membrane module including the same make it possible to suppress the occurrence of concentration polarization on the membrane surface of a reverse osmosis membrane and improve the resistance to pressure of a permeated liquid passage member, whereby permeated water of high quality can be produced steadily at a high recovery rate even when the element is operated at a high pressure for a long time with seawater having a high concentration. In the apparatus for reverse osmosis separation in which the module is incorporated, the provision of a turbocharger pressurizing pump, serving as a pressurizing means for feed liquid, makes it possible to pressurize feed liquid with use of the pressure energy of concentrated liquid flow. Therefore, the cost of energy required for operating the apparatus can be lowered. This contributes much to lowering the water production cost.

What is claimed is:

1. A spiral reverse osmosis membrane element, wherein
a plurality of bag-shaped reverse osmosis membranes, permeated liquid passage members arranged inside said reverse osmosis membranes, and a plurality of feed liquid passage members interposed between said reverse osmosis membranes are wound around an outer surface of a hollow pipe in a manner that only the interiors of said reverse osmosis membranes communicate with through-holes formed in the surface of said hollow pipe;
each of said feed liquid passage members is a mesh member having series of diamond-shaped meshes formed by a plurality of linear members crossing each other;
two opposite cross-points out of four cross-points of each of said diamond-shaped meshes are in line in parallel with an axial direction of said hollow pipe;
relationships 2 mm$\leq$X$\leq$5 mm and X<Y$\leq$1.8X are both satisfied where X denotes a distance between said cross-points in a direction perpendicular to the axial direction of said hollow pipe and Y denotes a distance between said cross-points in the axial direction of said hollow pipe; and
wherein the absolute value of an angle between a line connecting the cross-points which are in line in the axial direction of said hollow pipe and a mesh leg is within a range of from 29 to less than 45°.

2. A spiral reverse osmosis membrane element according to claim 1, wherein the average thickness of said feed liquid passage member is 0.5 to 1 mm.

3. A spiral reverse osmosis membrane element according to claim 1 or 2, wherein a maximum variable range of thickness of said feed liquid passage member is between values that are 0.9 times and 1.1 times said average thickness, respectively.

4. A spiral reverse osmosis membrane element according to claim 3, wherein the absolute value of an angle between a line connecting the cross-points which are in line in the axial direction of said hollow pipe and a mesh leg is within a range of from 29, inclusive, to less than 45°.

5. A spiral reverse osmosis membrane element according to claim 3, wherein said permeated liquid passage member comprises a woven or knitted fabric member of 1.15 to 0.4 mm in average thickness having a plurality of grooves at least on one side thereof, and a liquid-permeable fabric member of 0.05 to 0.2 mm in average thickness laid on the grooved surface of said woven or knitted fabric member.

6. A spiral reverse osmosis membrane element according to claim 1, wherein said feed liquid passage member is made of polyethylene or polypropylene.

7. A spiral reverse osmosis membrane element according to claim 1, wherein said permeated liquid passage member comprises a woven or knitted fabric member of 0.15 to 0.4 mm in average thickness having a plurality of grooves at least on one side thereof, and a liquid-permeable fabric member of 0.05 to 0.2 mm in average thickness laid on the grooved surface of said woven or knitted fabric member.

8. A reverse osmosis membrane module, wherein at least one spiral reverse osmosis membrane element according to claim 1 is arranged in a pressure vessel having an inlet for feed liquid at one end and an outlet for resulting concentrated liquid at the other end.

9. A reverse osmosis membrane module according to claim 7, wherein two or more spiral reverse osmosis membrane elements are connected in series and arranged in the pressure vessel.

10. An apparatus for reverse osmosis separation, comprising
a feed liquid separating section comprising reverse osmosis membrane modules according to claim 7 or 8 which are connected in multistage form; and
a feed liquid pressurizing means arranged on an upstream side of said separating section.

11. An apparatus for reverse osmosis separation according to claim 10, wherein said separating section comprises reverse osmosis membrane modules.

12. An apparatus for reverse osmosis separation according to claim 10, wherein said pressurizing means is a turbocharger pressurizing pump.

13. An apparatus for reverse osmosis separation according to claim 9, wherein a back pressure control valve is provided in a passage for permeated liquid extending from the separating section.

14. An apparatus for reverse osmosis separation according to claim 9, wherein said feed liquid is seawater, said reverse osmosis membrane modules are connected in at least two-stage form, an electric high-pressure pump is arranged on an upstream side of a reverse osmosis membrane in a precedent stage, a turbocharger pressurizing pump is arranged between the reverse osmosis membrane module in the precedent stage and a reverse osmosis membrane module in a subsequent stage, and a passage system for supplying concentrated liquid from the reverse osmosis membrane module in the precedent stage to a compressor section of said pressurizing pump and for circulating concentrated liquid from the reverse osmosis membrane module in the subsequent stage to a turbine section of said pressurizing pump is provided.

15. A method of reverse osmosis separation, comprising
a step of supplying feed liquid to the pressurizing means of an apparatus for reverse osmosis separation according to claim 9 and pressurizing the feed liquid, and
a step of supplying the pressurized feed liquid to the separating section of the apparatus and separating the pressurized feed liquid into permeated liquid and concentrated liquid.

16. A method of reverse osmosis separation of seawater using an apparatus for reverse osmosis separation according to claim 9, comprising
a first separating step of supplying pressurized seawater obtained by operating the electric high-pressure pump to a reverse osmosis membrane module in a precedent stage and separating the pressurized seawater into permeated water and concentrated water;
a second separating step of supplying the concentrated water produced in said first separating step to a reverse osmosis membrane module in a subsequent stage via the compressor section of the turbocharger pressurizing pump and separating said concentrated water further into permeated water and concentrated water; and
a step of circulating the concentrated water produced in said second separating step to the turbine section of said pressurizing pump.

17. A spiral reverse osmosis membrane element according to claim 1, wherein X and Y satisfy the relationship of 1.1X$\leq$Y<1.7X.

18. A spiral reverse osmosis membrane element according to claim 1, wherein X and Y satisfy the relationship of 1.2X$\leq$Y$\leq$1.5X.

* * * * *